United States Patent
Davis

(10) Patent No.: US 9,545,172 B2
(45) Date of Patent: Jan. 17, 2017

(54) ROLLER GRILL

(71) Applicant: ADCO Industries-Technologies, L.P., Dallas, TX (US)

(72) Inventor: Raymond E. Davis, Heath, TX (US)

(*) Notice: Subject to any disclaimer, the term of this patent is extended or adjusted under 35 U.S.C. 154(b) by 116 days.

(21) Appl. No.: 14/177,997

(22) Filed: Feb. 11, 2014

(65) Prior Publication Data

US 2015/0223638 A1 Aug. 13, 2015

(51) Int. Cl.
| | |
|---|---|
| A22C 7/00 | (2006.01) |
| A23P 1/00 | (2006.01) |
| A47J 43/18 | (2006.01) |
| A47J 37/04 | (2006.01) |
| A47J 37/07 | (2006.01) |
| A47J 37/06 | (2006.01) |

(52) U.S. Cl.
CPC .......... *A47J 37/048* (2013.01); *A23L 5/10* (2016.08); *A47J 37/042* (2013.01); *A47J 37/045* (2013.01); *A47J 37/049* (2013.01); *A47J 37/0754* (2013.01); *A47J 37/0694* (2013.01)

(58) Field of Classification Search
CPC .... A47J 37/049; A47J 37/0694; A47J 37/041; A47J 37/0704; A47J 37/0763; A47J 37/08; A47J 39/00; A21B 5/03
USPC .......... 99/427, 441, 421 R, 423, 443 R, 449, 339,99/393, 448
See application file for complete search history.

(56) References Cited

U.S. PATENT DOCUMENTS

| | | |
|---|---|---|
| 648,724 A | 5/1900 | Cole |
| 2,014,384 A | 9/1935 | John |
| 2,185,979 A | 1/1940 | Arthur |
| 2,253,434 A | 8/1941 | Kernick |
| 2,290,572 A | 7/1942 | Rakov |
| 2,453,385 A | 11/1948 | Rone |
| 2,577,963 A | 12/1951 | Hagopian |
| 2,602,392 A | 7/1952 | Albert |
| 2,604,842 A * | 7/1952 | Dolce ............................. 99/423 |
| 2,656,867 A | 10/1953 | Aguilar |
| 2,697,395 A * | 12/1954 | Steriss ............................ 99/423 |
| 2,745,363 A | 5/1956 | James |
| 2,813,599 A | 11/1957 | Amberg |
| 2,905,076 A * | 9/1959 | Del Francia ................ 99/443 R |
| 2,933,934 A | 4/1960 | Haroldson |
| 3,199,317 A | 8/1965 | Walsh |
| 3,298,303 A | 1/1967 | Waller |

(Continued)

OTHER PUBLICATIONS

PhyMet, Inc., "MicroPoly Product Catalog," May 2011, downloaded on Feb. 23, 2011, from www.micropolylubricants.com (19 pages).

*Primary Examiner* — Dana Ross
*Assistant Examiner* — Hemant Mathew
(74) *Attorney, Agent, or Firm* — Baker Law Firm

(57) ABSTRACT

A roller grill includes a housing structure adapted to support the roller grill; a plurality of tubular heating surfaces mounted between a first end of the housing structure and a second end of the housing structure; a first side housing coupled to the first end of the housing structure; a second side housing coupled to the second end of the housing structure, at least one of the first side housing or the second housing including a pressurized plenum maintainable at a plenum air pressure that is greater than a tubular air pressure of an inner volume of the plurality of tubular heating surfaces; and a drive assembly at least partially enclosed in the first side housing or the second side housing, the drive assembly configured to rotatably drive the plurality of tubular heating surfaces.

23 Claims, 16 Drawing Sheets

(56) References Cited

U.S. PATENT DOCUMENTS

| | | | | |
|---|---|---|---|---|
| 3,331,308 A | * | 7/1967 | Hoffert | 99/340 |
| 3,472,156 A | * | 10/1969 | Bardeau | 99/423 |
| 3,492,938 A | | 2/1970 | Oxford | |
| 3,611,913 A | | 10/1971 | McGinley | |
| 3,617,699 A | * | 11/1971 | Othmer | 392/469 |
| 3,639,077 A | | 2/1972 | Slates | |
| 3,682,088 A | | 8/1972 | Paniez | |
| 3,692,351 A | | 9/1972 | Christopher | |
| 3,756,219 A | | 9/1973 | Snyder | |
| 3,804,228 A | | 4/1974 | Felstehausen | |
| 3,841,299 A | * | 10/1974 | Tomita | 126/25 B |
| 3,854,392 A | | 12/1974 | Eason | |
| 3,858,500 A | | 1/1975 | Rohm | |
| 3,981,233 A | | 9/1976 | Nugarus | |
| 4,154,154 A | | 5/1979 | Vivian | |
| 4,370,920 A | * | 2/1983 | Henriques et al. | 99/339 |
| 4,372,199 A | * | 2/1983 | Brown et al. | 99/341 |
| 4,516,485 A | * | 5/1985 | Miller | 99/339 |
| 4,578,120 A | | 3/1986 | Chiarella | |
| 4,593,923 A | | 6/1986 | Thalmann | |
| 4,627,368 A | | 12/1986 | Reich | |
| 4,683,813 A | | 8/1987 | Schultz | |
| 4,873,107 A | * | 10/1989 | Archer | 426/520 |
| 4,891,037 A | | 1/1990 | Maples | |
| 648,866 A | | 5/1990 | Gibford | |
| 5,020,637 A | | 6/1991 | Hoenselaar | |
| 5,058,493 A | | 10/1991 | Basek | |
| 5,117,748 A | | 6/1992 | Costa | |
| 5,184,374 A | | 2/1993 | Barauke | |
| 5,213,180 A | | 5/1993 | Masonek | |
| 5,360,084 A | | 11/1994 | Graf | |
| 5,458,051 A | | 10/1995 | Alden | |
| 5,484,038 A | | 1/1996 | Rowell | |
| 5,549,040 A | | 8/1996 | Naramura | |
| 5,562,022 A | * | 10/1996 | Schmid et al. | 99/421 H |
| 5,611,263 A | | 3/1997 | Huang | |
| 5,664,347 A | | 9/1997 | Chapman | |
| 5,669,290 A | | 9/1997 | Natsumi | |
| 5,669,839 A | | 9/1997 | Graf | |
| 5,722,315 A | | 3/1998 | Naramura | |
| 5,758,568 A | | 6/1998 | Moravec | |
| 5,870,949 A | | 2/1999 | Cimperman | |
| 5,901,637 A | | 5/1999 | Glucksman | |
| 6,047,633 A | | 4/2000 | Khaytman | |
| 6,079,319 A | | 6/2000 | Doria | |
| 6,166,353 A | | 12/2000 | Senneville | |
| 6,257,369 B1 | | 7/2001 | Pesl | |
| 6,263,656 B1 | | 7/2001 | Barauke | |
| 6,349,634 B1 | * | 2/2002 | Delpierre et al. | 99/441 |
| 6,354,193 B1 | * | 3/2002 | Lee | 99/334 |
| 6,393,971 B1 | | 5/2002 | Hunot | |
| 6,439,109 B1 | | 8/2002 | Rehill | |
| 6,478,115 B1 | | 11/2002 | Wech | |
| 6,626,660 B1 | | 9/2003 | Olson | |
| 6,707,015 B2 | * | 3/2004 | Huegerich et al. | 219/494 |
| 6,782,802 B2 | | 8/2004 | Hunot | |
| 6,942,409 B2 | | 9/2005 | Barbieri | |
| 7,152,571 B1 | | 12/2006 | Wilson | |
| 7,334,517 B2 | | 2/2008 | Gaskill | |
| 7,367,261 B2 | * | 5/2008 | Gaskill et al. | 99/339 |
| 7,520,211 B2 | | 4/2009 | Hunot | |
| 7,591,220 B2 | * | 9/2009 | Sheridan, Jr. | 99/441 |
| 8,109,365 B2 | | 2/2012 | Taguchi | |
| 2001/0045345 A1 | | 11/2001 | Luigi | |
| 2002/0017202 A1 | * | 2/2002 | Hunot et al. | 99/423 |
| 2002/0148359 A1 | | 10/2002 | Hunot | |
| 2002/0195002 A1 | | 12/2002 | Dominguez | |
| 2003/0132088 A1 | | 7/2003 | Watanabe | |
| 2003/0197001 A1 | | 10/2003 | Grohs | |
| 2003/0197005 A1 | * | 10/2003 | Huegerich et al. | 219/494 |
| 2004/0255561 A1 | | 12/2004 | Heilman | |
| 2005/0045131 A1 | | 3/2005 | Okazawa | |
| 2005/0049096 A1 | | 3/2005 | Eck | |
| 2005/0051037 A1 | * | 3/2005 | Gaskill et al. | 99/421 R |
| 2005/0061161 A1 | * | 3/2005 | Hunot et al. | 99/441 |
| 2005/0064972 A1 | | 3/2005 | Rusheidat | |
| 2005/0260319 A1 | | 11/2005 | Khalaf | |
| 2006/0115557 A1 | | 6/2006 | Schlienger | |
| 2006/0260477 A1 | | 11/2006 | Jackman | |
| 2006/0260874 A1 | | 11/2006 | Lockledge | |
| 2007/0059413 A1 | | 3/2007 | Hartmann | |
| 2007/0102418 A1 | | 5/2007 | Swank | |
| 2007/0232427 A1 | | 10/2007 | Ueno | |
| 2007/0283822 A1 | * | 12/2007 | Sheridan | 99/441 |
| 2008/0022799 A1 | | 1/2008 | Kashimura | |
| 2008/0022800 A1 | | 1/2008 | Kobayashi | |
| 2008/0090687 A1 | | 4/2008 | Eck | |
| 2008/0282903 A1 | | 11/2008 | Gonzalez | |
| 2009/0092718 A1 | | 4/2009 | Mendenhall | |
| 2009/0277299 A1 | | 11/2009 | Gmirya | |
| 2010/0064874 A1 | | 3/2010 | Nagorka | |
| 2010/0089702 A1 | | 4/2010 | Sasaki | |
| 2010/0122630 A1 | | 5/2010 | Nimerovskiy | |
| 2010/0183784 A1 | | 7/2010 | Van Blokland | |
| 2010/0255158 A1 | | 10/2010 | Luther | |
| 2010/0264346 A1 | | 10/2010 | Bussear | |
| 2010/0297321 A1 | | 11/2010 | Strauch | |
| 2012/0103319 A1 | | 5/2012 | Sheridan | |
| 2012/0204902 A1 | | 8/2012 | Petersen | |
| 2013/0104746 A1 | | 5/2013 | Hankins | |
| 2013/0104747 A1 | | 5/2013 | Davis | |
| 2013/0104748 A1 | | 5/2013 | Hankins | |
| 2013/0104749 A1 | | 5/2013 | Davis | |
| 2013/0104750 A1 | | 5/2013 | Hankins | |
| 2013/0104751 A1 | | 5/2013 | Hampton | |

* cited by examiner

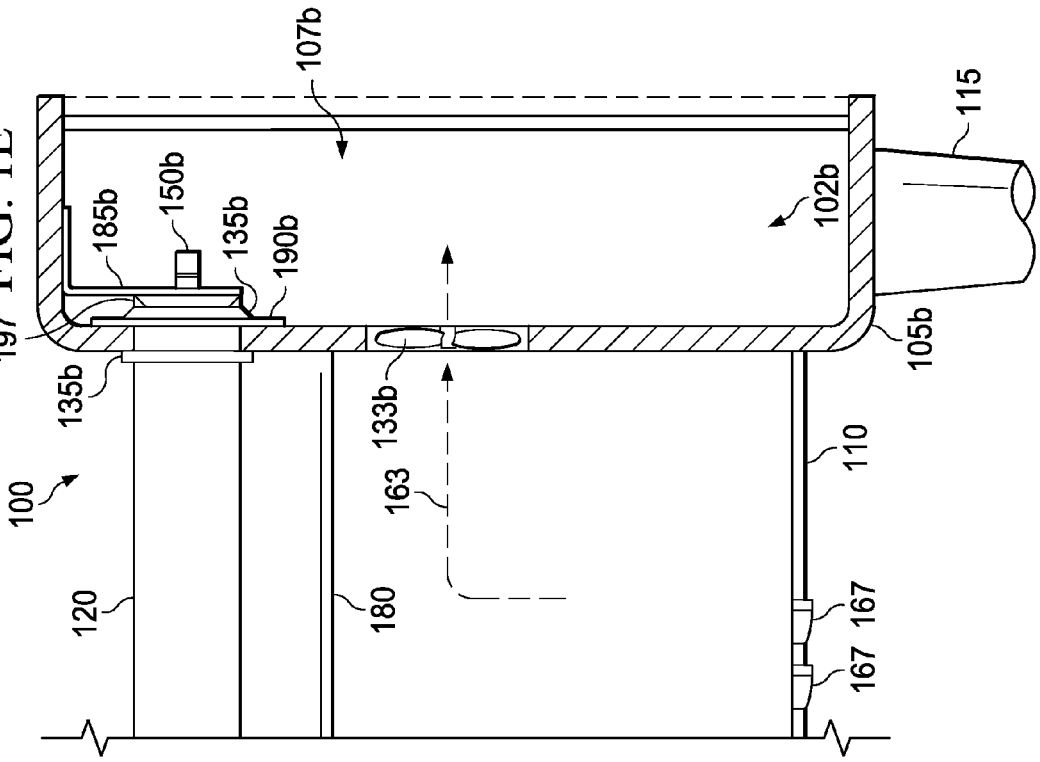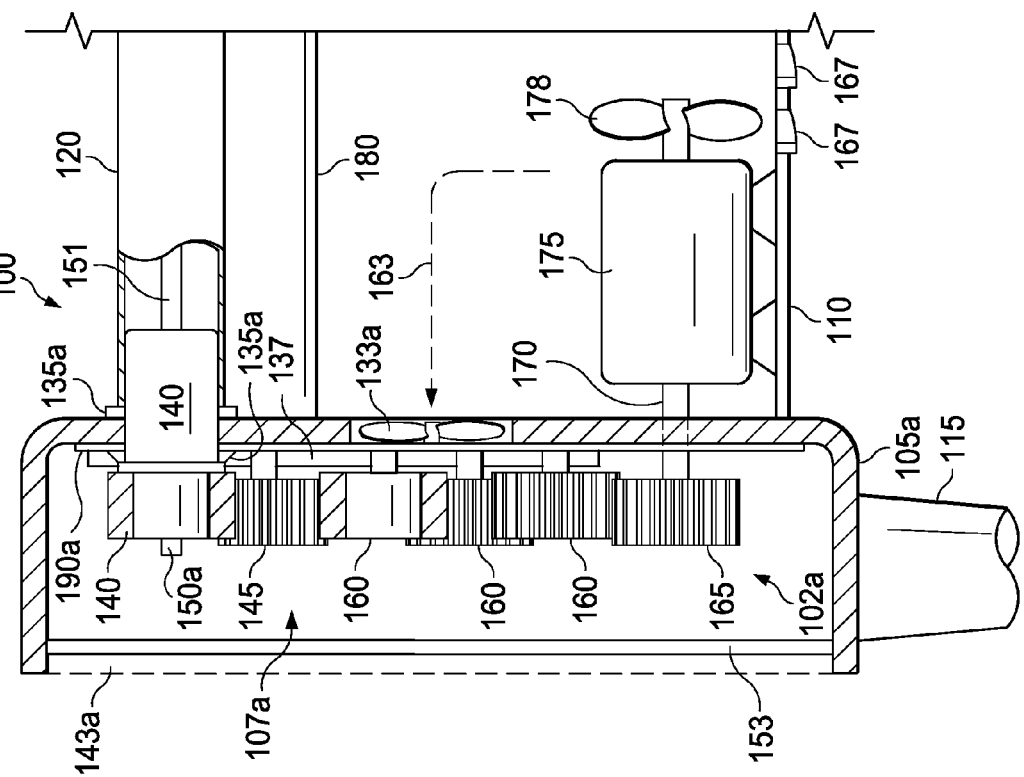

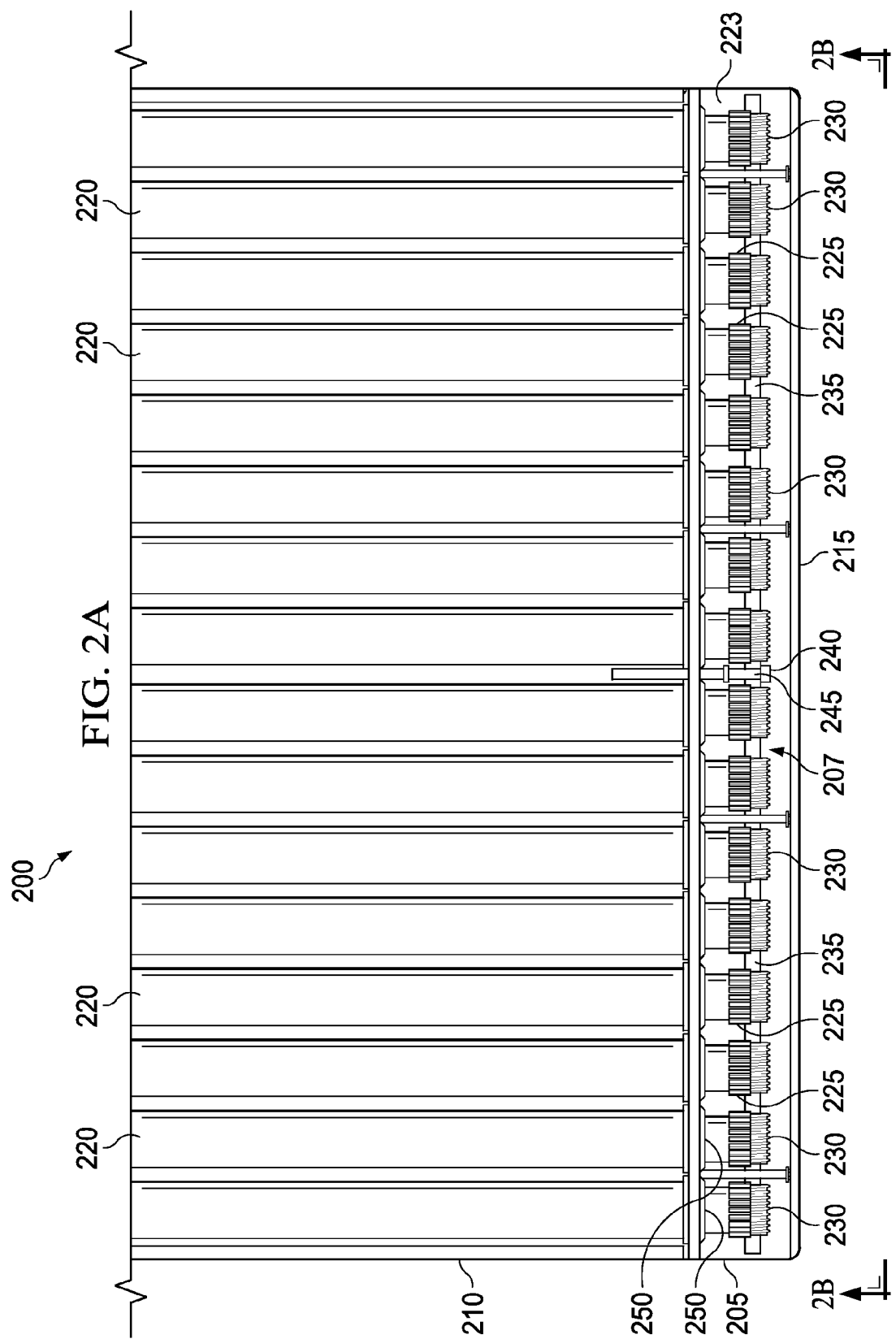

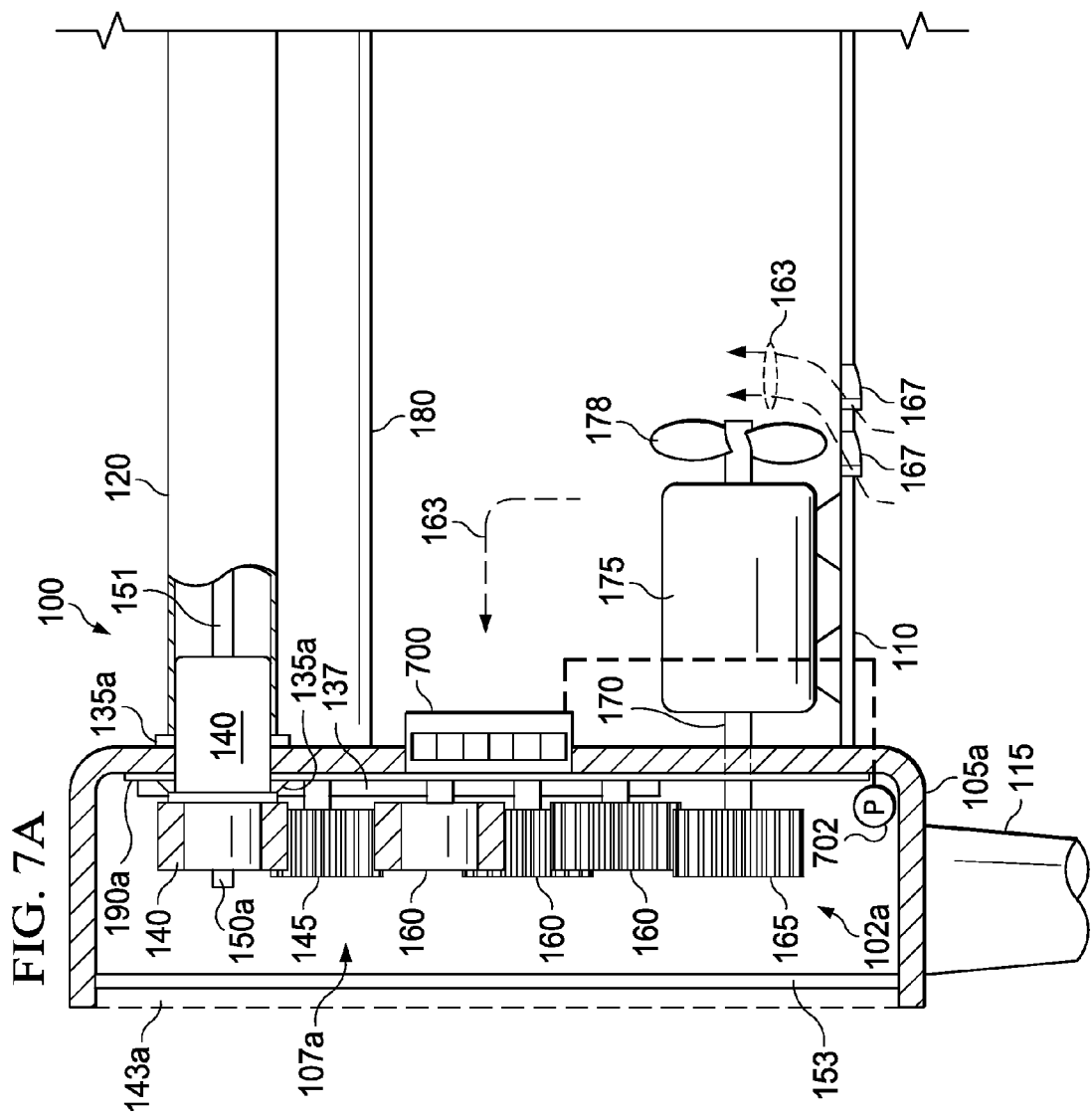

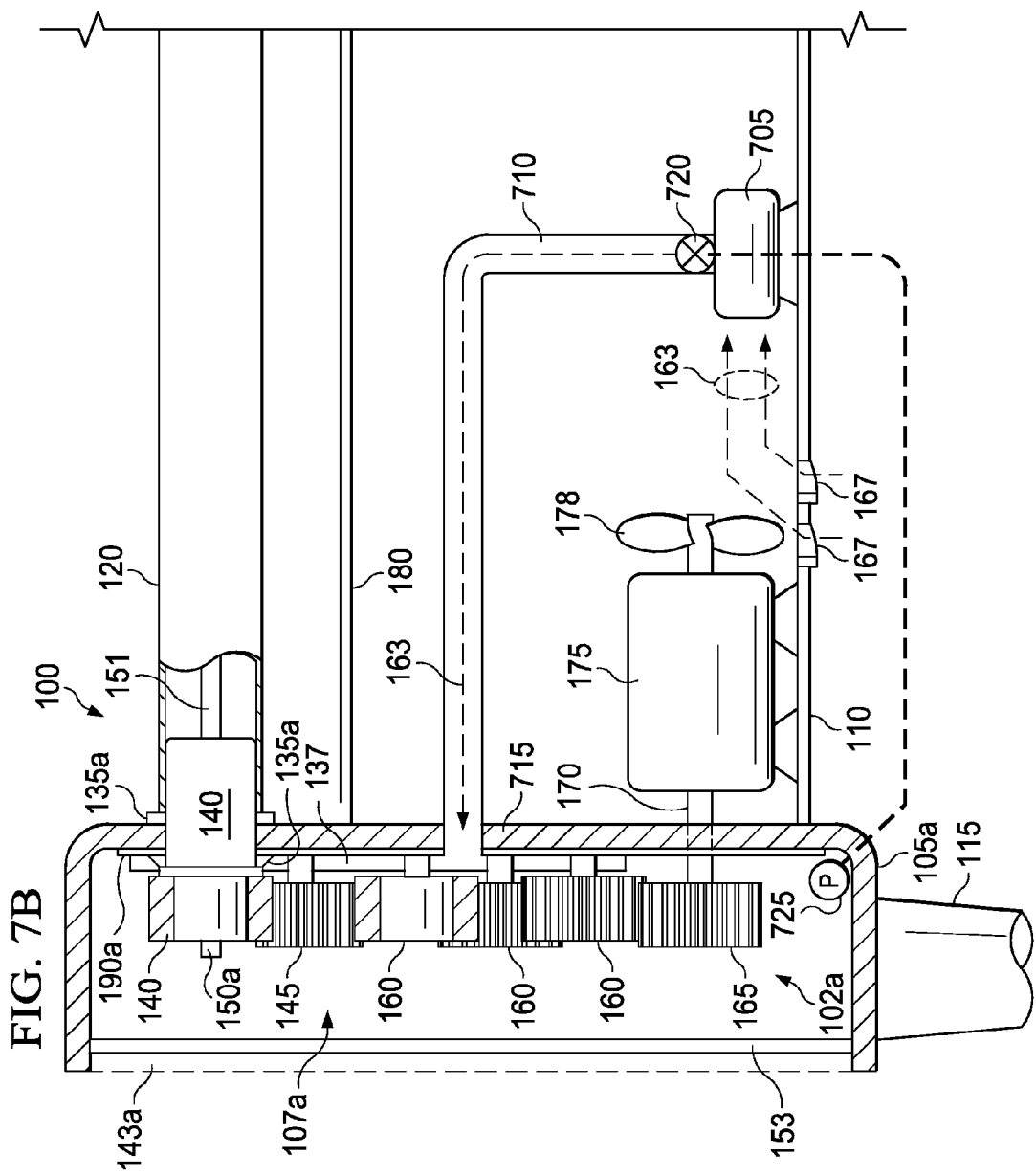

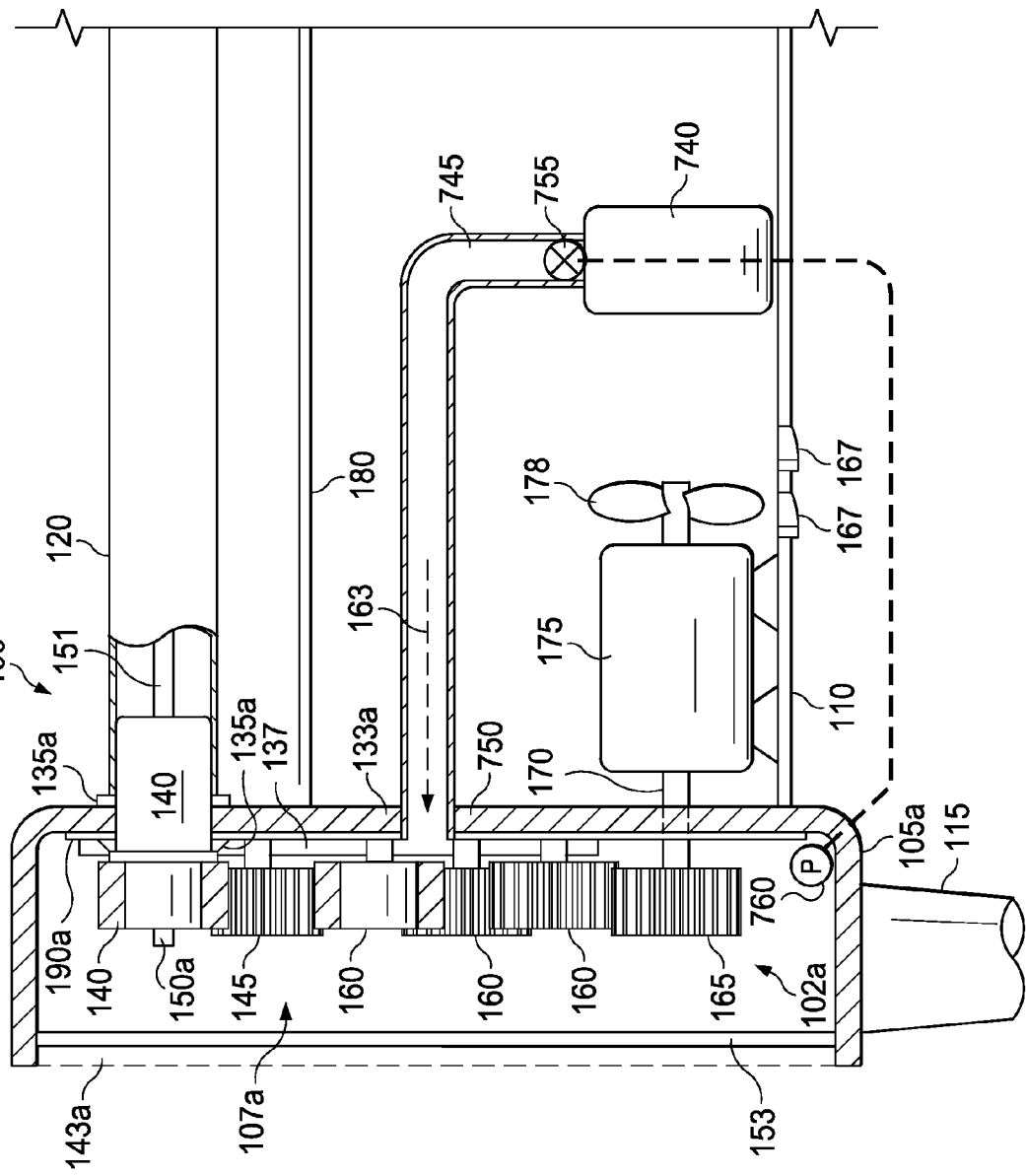

ROLLER GRILL

TECHNICAL BACKGROUND

This disclosure relates to a roller grill or griddle for heating and/or reheating pre-cooked food product.

BACKGROUND

Various apparatus are used to heat and/or reheat prepared consumer pre-cooked food products. In some instances, cylindrically shaped pre-cooked food products, such as hotdogs, tacquitos, cheese burger bites, and sausage links, may be prepared using a roller grill apparatus, which may include a number of heated, rotating tubes upon which the pre-cooked food products rest and rotate. While the heat conducting and/or radiating from the tubes and the rotation of the tubes allow the pre-cooked food products to be heated substantially uniformly, these features can also impose detrimental effects on other components of the roller grill apparatus. For example, heat conducted and/or radiated from the ends of the tubes is transferred to rotating drive mechanism components in contact with the ends of the tubes, such as chains, lubricants, bearings, and other components. The heat conducted and/or radiated through these components, as well as the mechanical engagement of these components with one another during operation of the roller grill apparatus, can cause gradual deterioration and eventual failure of such components.

Conventionally, roller grills and/or griddles used for heating and/or reheating pre-cooked food products have used chain drive assemblies to drive (e.g., rotate) tubular heating surfaces on which the pre-cooked food products may be placed. The chain drive assemblies typically utilize a metallic chain that engages metallic sprockets mounted on the tubular heating surfaces. Due in part to the metal-on-metal contact, as well as the heat energy conducted through and/or radiated from the sprockets and chain from the tubular heating surfaces (and other components of conventional roller grills), the chain drive assembly may require regular maintenance (e.g., lubrication, adjustment of the chain and/or the sprockets to maintain suitable engagement, and otherwise). Without such regular maintenance, conventional roller grills often experience high failure rates.

In some instances, pre-cooked food products must be heated to a minimum internal temperature in order to, for example, kill bacteria that can cause food related illness. For instance, certain standards (e.g., NSF International) have been established that require pre-cooked food product to be heated to a minimum internal temperature for safety reasons.

SUMMARY

In a general embodiment, a roller grill includes a housing structure adapted to support the roller grill; a plurality of tubular heating surfaces mounted between a first end of the housing structure and a second end of the housing structure; a first side housing coupled to the first end of the housing structure; a second side housing coupled to the second end of the housing structure, at least one of the first side housing or the second housing including a pressurized plenum maintainable at a plenum air pressure that is greater than a tubular air pressure of an inner volume of the plurality of tubular heating surfaces; and a drive assembly at least partially enclosed in the first side housing or the second side housing, the drive assembly configured to rotatably drive the plurality of tubular heating surfaces.

A first aspect combinable with the general embodiment further includes a fan coupled to the housing structure and in airflow communication with the pressurized plenum and an ambient environment that surrounds the roller grill.

In a second aspect combinable with any of the previous aspects, the fan is configured to circulate a flow of ambient air into the pressurized plenum to maintain the plenum air pressure greater than the tubular air pressure.

A third aspect combinable with any of the previous aspects further includes a cover plate mountable to the one of the first side housing or the second housing that includes the pressurized plenum to at least partially seal against an airflow between the pressurized plenum and the ambient environment independent of the flow of ambient air.

In a fourth aspect combinable with any of the previous aspects, the cover plate includes at least one relief opening that includes an airflow pathway between the pressurized plenum and the ambient environment.

In a fifth aspect combinable with any of the previous aspects, the airflow pathway between the pressurized plenum and the ambient environment includes an adjustable opening area based on at least one of the plenum air pressure or the tubular air pressure.

In a sixth aspect combinable with any of the previous aspects, the other of the first side housing or the second housing includes a second pressurized plenum that is maintainable at a second plenum air pressure that is greater than the tubular air pressure of the inner volume of the plurality of tubular heating surfaces.

A seventh aspect combinable with any of the previous aspects further includes a second fan coupled to the housing structure and in airflow communication with the second pressurized plenum and the ambient environment that surrounds the roller grill.

In an eighth aspect combinable with any of the previous aspects, the second fan is configured to circulate a second flow of ambient air into the second pressurized plenum to maintain the second plenum air pressure greater than the tubular air pressure.

In a ninth aspect combinable with any of the previous aspects, a surface temperature measured along a length of a first tubular heating surface of the plurality of tubular heating surfaces is within a range of between ±2° F. and ±5° F.

In a tenth aspect combinable with any of the previous aspects, the drive assembly includes a beltless direct drive assembly that includes at least one drive gear in direct contact with a transfer gear, which in turn is in direct or indirect contact with at least one idler gear, which in turn is in direct contact with at least one tube gear.

In an eleventh aspect combinable with any of the previous aspects, at least one of the drive gear, the transfer gear, the idler gear, or the tube gear includes a non-metallic gear.

In a twelfth aspect combinable with any of the previous aspects, the drive assembly includes at least one drive gear driveably coupled to a belt or chain, which in turn is driveably coupled to at least one tube gear.

In a thirteenth aspect combinable with any of the previous aspects, the drive assembly includes a slip clutch motor.

In another general embodiment, a method includes providing a roller grill that includes a housing structure adapted to support the roller grill, a plurality of tubular heating surfaces mounted between a first end of the housing structure and a second end of the housing structure, and to a drive assembly, a first side housing coupled to the first end of the housing structure, and a second side housing coupled to the second end of the housing structure; rotatably driving the plurality of tubular heating surfaces with the drive assembly; pressurizing a plenum enclosed within one of the first or second side housings; and maintaining, based on the pressurization, a plenum air pressure greater than a tubular air pressure of an inner volume of the plurality of tubular heating surfaces.

In a first aspect combinable with the general embodiment, pressurizing a plenum enclosed within one of the first or second side housings includes circulating an airflow into the plenum with a fan coupled to the housing structure and in airflow communication with the plenum and an ambient environment that surrounds the roller grill.

A second aspect combinable with any of the previous aspects further includes mounting a cover plate mountable to the one of the first or second side housings that encloses the plenum; and at least partially sealing against an airflow between the plenum and the ambient environment independent of the airflow into the plenum.

A third aspect combinable with any of the previous aspects further includes providing at least one relief opening in the cover plate; and flowing a portion of the airflow from the plenum through the relief opening.

A fourth aspect combinable with any of the previous aspects further includes adjusting an opening area of the relief opening based on at least one of the plenum air pressure or the tubular air pressure.

A fifth aspect combinable with any of the previous aspects further includes circulating a second airflow into a second plenum enclosed within the other of the first or second side housings; and maintaining, based on the second airflow circulation, a second plenum air pressure greater than the tubular air pressure of the inner volume of the plurality of tubular heating surfaces.

In a sixth aspect combinable with any of the previous aspects, circulating a second airflow into a second plenum enclosed within the other of the first or second side housings includes circulating the second airflow into the second plenum with a second fan coupled to the housing structure and in airflow communication with the second plenum and the ambient environment that surrounds the roller grill.

In a seventh aspect combinable with any of the previous aspects, a surface temperature measured along a length of a first tubular heating surface of the plurality of tubular heating surfaces is within a range of between ±2° F. and ±5° F.

In an eighth aspect combinable with any of the previous aspects, rotatably driving the plurality of tubular heating surfaces with the drive assembly includes driving a drive gear with a motor; driving at least one transfer gear with the drive gear; driving at least one idler gear with the transfer gear; and driving at least one tube gear with the idler gear.

In a ninth aspect combinable with any of the previous aspects, at least one of the drive gear, the transfer gear, the idler gear, or the tube gear includes a non-metallic gear, and the drive assembly includes a beltless and chainless drive assembly.

In a tenth aspect combinable with any of the previous aspects, rotatably driving the plurality of tubular heating surfaces with the drive assembly includes driving a drive gear with a motor; moving a belt or chain with the drive gear; driving at least one tube gear with the moving belt or chain.

In an eleventh aspect combinable with any of the previous aspects, rotatably driving the plurality of tubular heating surfaces with the drive assembly includes driving the plurality of tubular heating surfaces with a slip clutch motor.

Various embodiments of a roller grill according to the present disclosure may include one or more of the following features. For example, the roller grill that includes one or more pressurized plenums may help prevent (e.g., all or partially) heat from escaping from a number of tubular heating surfaces into an ambient environment through a heat transfer pathway that does not include the heating surfaces, themselves. In another example, one or more non-metallic gears (or metallic gears) may be cooled in a pressurized plenum of the roller grill. In some examples, a pressurized plenum of the roller grill may facilitate a more even heat distribution across one or more tubular heating surfaces. In some examples, the pressurized plenum may prevent or help prevent heat from escaping through ends of the tubular heating surfaces. Thus, in some examples, the roller grill may be more energy efficient and more economical to operate compared to conventional roller grills. As yet a further example, the roller grill may heat food product more evenly across an entire area of heating surfaces (e.g., tubular rollers). This may, in some examples, reduce product from over cooking, under cooking, burning, or deformation, thereby providing a food product that is free of bacteria, edible, and maintains a pleasing appearance to a consumer. As yet a further example, the roller grill that includes a pressurized plenum may maintain contactable non-heating surfaces (e.g., a housing) at a temperature that is safe for human contact without burn-related injuries.

These general and specific embodiments may be implemented using a device, system or method, or any combinations of devices, systems, or methods. The details of one or more embodiments are set forth in the accompanying drawings and the description below. Other features, objects, and advantages will be apparent from the description and drawings, and from the claims.

DESCRIPTION OF DRAWINGS

FIGS. 1A-1E illustrate views of an example embodiment of a roller grill that includes a direct drive system and one or more pressurized plenums;

FIGS. 2A-2C illustrate views of an example embodiment of a roller grill that includes a belt drive system and one or more pressurized plenums;

FIGS. 7A-7D illustrate side views of a portion of an example embodiment of a roller grill that includes one or more pressurization assemblies.

DETAILED DESCRIPTION

Figure 1A:
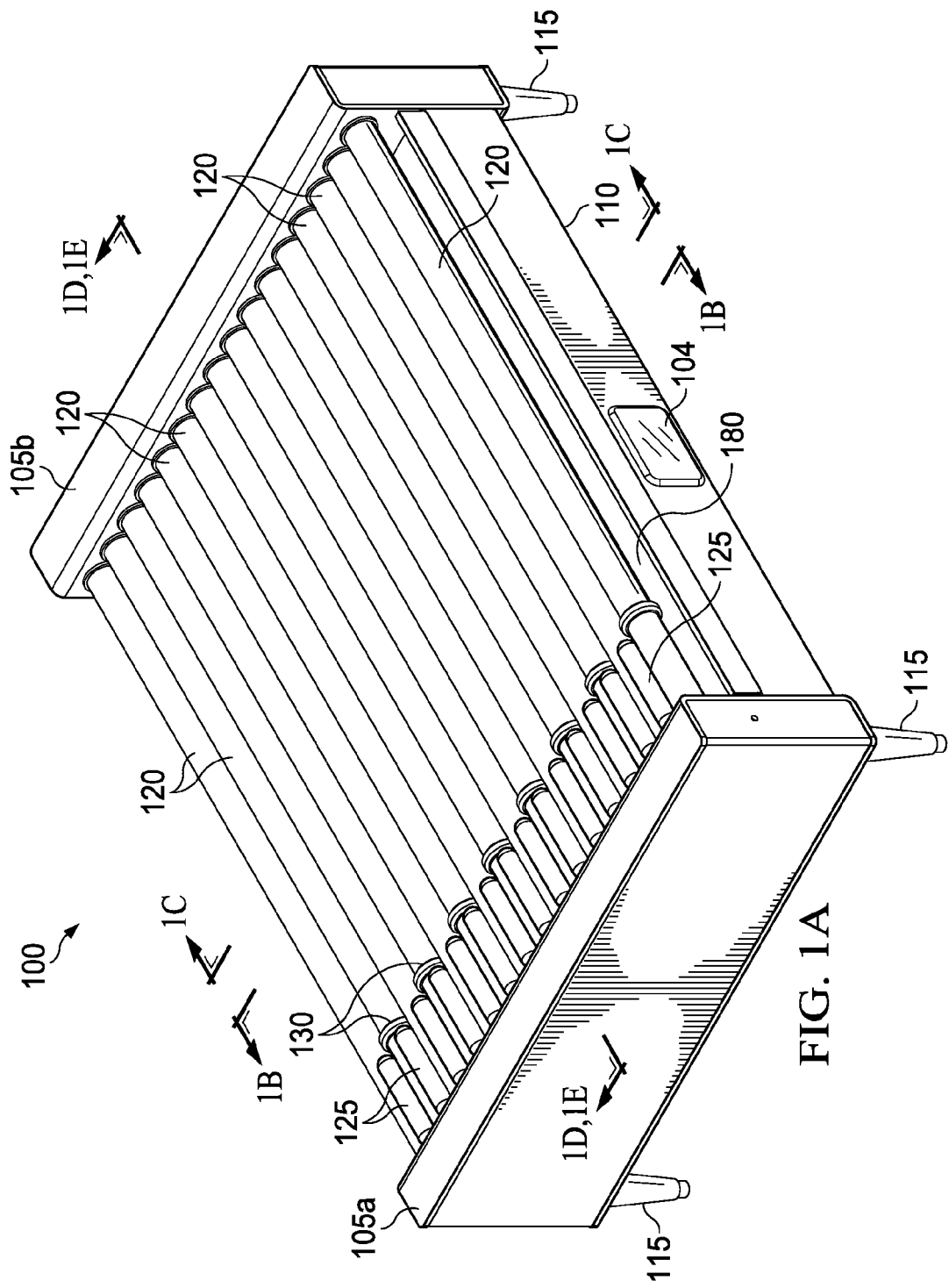

This disclosure relates to apparatus for heating and/or reheating prepared consumer pre-cooked food products, and more particularly, to roller grills and/or griddles used for heating and/or reheating cylindrically shaped pre-cooked food products, such as hotdogs and sausage links. Although in some embodiments, a roller grill according to the present disclosure may only heat and/or reheat a pre-cooked food product, in other embodiments, a roller grill according to the present disclosure may cook a raw food product.

In a general embodiment, a roller grill includes two side housings, a bottom housing, and multiple heating tubes that are disposed parallel to one another, across a volume defined between upper regions of opposite panels of the two side housings, and above the bottom housing. The heating tubes are positioned sufficiently close to one another, such that their positioning allows a pre-cooked food product to simultaneously rest atop two adjacent heating tubes. The heating tubes are further designed to rotate 360 degrees and have outer surfaces that are adapted to transfer heat to pre-cooked food products, thereby allowing the heating tubes to heat and/or reheat pre-cooked food products that rest atop the heating tubes.

Each of the side housings of the roller grill may include or form a pressurized plenum that, in some aspects, are maintained at an air pressure greater (e.g., slightly or significantly) than an air pressure of the heating tubes (e.g., an air pressure of an interior volume of the tubular heating surfaces). In some aspects, the air pressure in a pressurized plenum of the roller grill may be equal to the air pressure inside the heating tubes to prevent or help prevent the heat (e.g., generated by an electric resistance heater positioned in the interior volume of the tubes) from escaping into the plenum rather than the tube surface and into food product. In some aspects, the pressurized plenum may be substantially sealed against unwanted air leakage out of the plenum (e.g., into an ambient environment) while also allowing some airflow out of the plenum.

In some aspects, the air pressure in the pressurized plenums may be balanced with the air pressure in the interior volumes of the heating tubes so that minimal or insignificant airflow into or out of the heating tubes (e.g., into the plenums) occurs. For example, in conventional roller grills that do not include pressurized plenums in the side housings, significant airflow from the interior volumes of heating tubes may convectively transfer heat (e.g., generated by electric resistance heat installed in the interior volumes) into the side housings. Such heat transfer may degrade a performance and/or components of a drive assembly that rotates the heating tubes. Such heat transfer may also waste energy and money. Further, such heat transfer may result in uneven temperatures along the heating surfaces of the heating tubes. For instance, in some conventional roller grills, temperature variation along a length of a heating tube may be as much as about 50° F. (from 225° F. to 175° F.) (or about 29° C., from 108° C. to 79° C.) along a length of a particular tube (e.g., from end to end). Further, in conventional roller grills, heat may be undesirably transferred to other components of the roller grill, such as the side housings, which may reach up to 240° F. (116° C.).

In some embodiments of a roller grill with one or more pressurized plenums, an air moving device (e.g., a fan) may be positioned to circulate an airflow into the plenums to maintain the air pressure. In some aspects, there may be a 1:1 ratio of air moving devices and pressurized plenums; in some aspects, there may be a greater than 1:1 ratio. Such airflow may help maintain or maintain the plenum at a positive pressure relative to the air pressure in the interior volumes of the heating tubes. Further, in some aspects, in order to maintain or help maintain this positive pressure without overpressurizing the plenum, one or more relief outlets may be formed in the side housings, thereby providing for an outlet for plenum air to escape into an ambient environment. Overpressurization of the plenums may result in several issues. For example, if the air pressure in the pressurized plenums is much greater than the air pressure of the interior volumes of the heating tubes, a cooling airflow may be driven (e.g., by the pressure differential) into the interior volumes, thereby undesirably cooling the heating tubes. Also, overpressurization may result in deformation of side housing panels.

A roller grill that includes one or more pressurized plenums may also include a variety of drive systems that drive (e.g., rotate) the tubular heating surfaces. In each instance, the pressurized plenum(s) may help cool the drive assembly, cool other components of the roller grill (e.g., housing), and maintain a more consistent temperature of the roller tubes. For example, in some aspects, the roller grill may include a belt drive assembly having worm gears that provide rotary motion to the heating tubes. For example, the belt drive assembly can be driven by a motor that provides rotary motion to a timing belt that transfers the motion to a timing pulley, which further rotates a shaft on which worm gears are mounted and engage spur gears that are coupled to ends of the heating tubes. In some embodiments, the belt drive assembly can have timing pulleys coupled to the ends of the heating tubes and multiple idler pulleys that provide alternating heating and cooling cycles, respectively, for the timing belt during operation of the roller grill. In some examples, the timing pulleys can be maintained on the ends of the heating tubes by TEFLON™ flanges.

As another example, the roller grill may include a chain drive assembly having sprockets that provides rotary motion to the heating tubes. For example, the chain drive assembly can be driven by a motor that provides rotary motion to a chain, which transfers the motion to sprockets coupled to the ends of the heating tubes.

In other examples, the roller grill may have a direct drive assembly that includes a drive gear coupled to a motor and in engagement with one or more transfer gears configured to transfer rotational motion of the drive gear to matched sets of gears directly coupled to heating tubes. The gears may, in some embodiments, be spur gears. In some embodiments, the gears may be helical spur gears. In some embodiments, the gears may be non-metallic, such as, for example, a high-temperature plastic, In some embodiments, for example, one or more gears directly coupled to heating tubes may be a high-temperature plastic such as, for example, polystyrene, nylon, TEFLON™, polyethylene, polypropylene, polyvinyl chloride and polytetrafluoroethylene (PTFE), and other plastic material) that has a continual duty max temperature rating of between about 250° F. (121° C.) and about 500° F. (260° C.). In some embodiments, for example, one or more transfer and/or idler gears may be a high-temperature plastic that has a continual duty max temperature rating of between about 120° F. (49° C.) and about 200° F. (93° C.).

FIGS. 1A-1E illustrate views of an example embodiment of a roller grill 100 that includes a direct drive system and one or more pressurized plenums. The roller grill 100 can be used for heating and/or reheating pre-cooked food products, such as, for example, cylindrically shaped pre-cooked food products including hotdogs, sausage links, and other products. With reference to FIG. 1A in particular, the roller grill 100 includes two side housings 105a and 105b and a bottom housing 110 that is attached to and disposed between lower regions of panels of the two side housings 105a and 105b. The weight of the roller grill 100 is supported by multiple legs 115 that are mounted underneath and near corners of the bottom housing 110. The roller grill 100 further includes multiple heating tubes 120 that are disposed parallel to one another, across a volume defined between upper regions of opposite panels of the two side housings 105a and 105b, and above the bottom housing 110. The heating tubes 120 are positioned sufficiently close to one another, such that their positioning allows a pre-cooked food product 125 to simultaneously rest atop two adjacent heating tubes 120. One or more annular shaped dividers 130 may be mounted on one or more heating tubes 120 in order to prevent contact between two pre-cooked food products 125 resting atop common heating tubes 120 or to restrict lateral movement of pre-cooked food products 125 resting atop the heating tubes 120.

In some embodiments, the roller grill 100 may be approximately 36 inches (91.44 cm) in total length, and the heating tubes 120 may be approximately 35.625 inches (90.49 cm) in length. In some examples, the wall thickness of a heating tube may be between approximately 5/64 inches (0.20 cm) and approximately 1/8 inches (0.32 cm). In some examples, the width of the roller grill 100 may depend on the number of heating tubes 120 included within the roller grill 100. In some examples, the roller grill 100 can include multiple (e.g., 4, 8, 16, or other number) heating tubes 120.

In some embodiments, the heating tubes 120 have outer surfaces that are adapted to transfer heat to pre-cooked food products 125 (e.g., non-stick surfaces, cleanable surfaces, or otherwise). The heating tubes 120, in some embodiments, are further designed to rotate 360 degrees, which consequently rotates the pre-cooked food products 125 360 degrees that are in contact with the heating tubes 120. The heating tubes 120 may be heated by multiple electric resistive heat elements. In some embodiments, at least one of the electric resistive heat elements may be disposed within a bore of at least one of the heating tubes 120. In some examples, the heat conducted to the surfaces of the heating tubes 120 allows them to heat/and or reheat the pre-cooked food products 125. In some instances, the electric resistive heat elements can enable the surface temperatures of the heating tubes 120 to reach up to 300° F. (149° C.). In any event, the heating tubes 120 can heat the pre-cooked food products 125 to an internal temperature of about 160° F. (71° C.), or other temperature, to ensure that any bacteria is killed and/or eliminated.

As illustrated, the roller grill 100 may also include a drip plate 180 extending between the side housings 105a and 105b and underneath the heating tubes 120. In some embodiments, the drip plate 180 may define a bottom side of a volume extending from directly underneath the heating tubes 120 to the drip plate 180 and between the side housings 105a and 105b. Such a volume, in some embodiments, may define a sanitary volume into which no mechanical components of the roller grill 100 (e.g., gears, motors, shafts, and other components) may extend. The drip plate 180 may, in some embodiments, be a cleanable surface that catches drippings and other solids and/or liquids from the pre-cooked food product 125.

In some embodiments, the roller grill 100 can include a controller 104 that sets the roller grill 100 to operate in one or more heating modes. For example, the heating modes may include a "Preparation" mode that heats pre-cooked food products 125 to a set minimum preparation temperature (e.g., 160° F. (71° C.) internal) or a "Ready-to-Serve" mode that maintains the internal temperature of the pre-cooked food products 125 at a set serving temperature by cycling the heat on and off. In some examples, the preparation temperature of the heating tubes 120 may reach up to 300° F. (149° C.). In some examples, the serving temperature of the heating tubes 120 may reach up to 240° F. (116° C.) in order to maintain an internal pre-cooked food product temperature in the range of 140-160° F. (60-71° C.). The roller grill 100 can further be designed to operate in other heating modes (e.g., a timed heating mode, an overnight heating mode, a "wake up" heating mode, and others).

In some aspects, the controller 104 can increase or decrease an amount of heating power supplied by the heating elements 151 based on one or more measured criteria. For example, in some aspects, electrical power (e.g., voltage or current) supplied to the heaters 151 can be varied based on a sensed temperature of the tubes 120 (e.g., temperature of outer heating surfaces). In another example, electrical power (e.g., voltage or current) supplied to the heaters 151 can be varied based on a temperature differential between a sensed temperature of the tubes 120 (e.g., temperature of outer heating surfaces) and an ambient air temperature. In some aspects, a temperature of the heating tubes 120 may be "set" on the controller 104 and adjustable based on, for example, type of food product 125 placed on the heating tubes 120, "doneness" of the food product 125, or otherwise. The controller 104 may vary the electrical power to the heating elements 151 in order to ensure, for instance, that food product 125 is properly and safely heated or cooked (e.g., by increasing or maintaining power), as well as to ensure that food product 125 does not become over-cooked (e.g., by decreasing power).

Turning to FIGS. 1B-1E, end and side views of a portion of the roller grill 100 are illustrated. As illustrated, the roller grill 100 includes pressurized plenums 107a and 107b enclosed within the side housings 105a and 105b in which the direct drive assembly may be disposed. The direct drive assembly may drive (e.g., rotate) the heating tubes 120 to heat and/or reheat pre-cooked food product. As illustrated, each heating tube 120 is installed over a tubular portion of a heating tube gear 140, which in turn, is installed through apertures in the side housing 105. A bushing 135a may also be installed through the aperture of the side housing 105 such that the heating tube 120 is disposed within the bushing 135a and may move (e.g., rotate) within the bushing 135a. In some embodiments, the bushing 135a may be a paired bushing, such that two heating tubes 120 are inserted through a single bushing 135a.

Figure 1B:
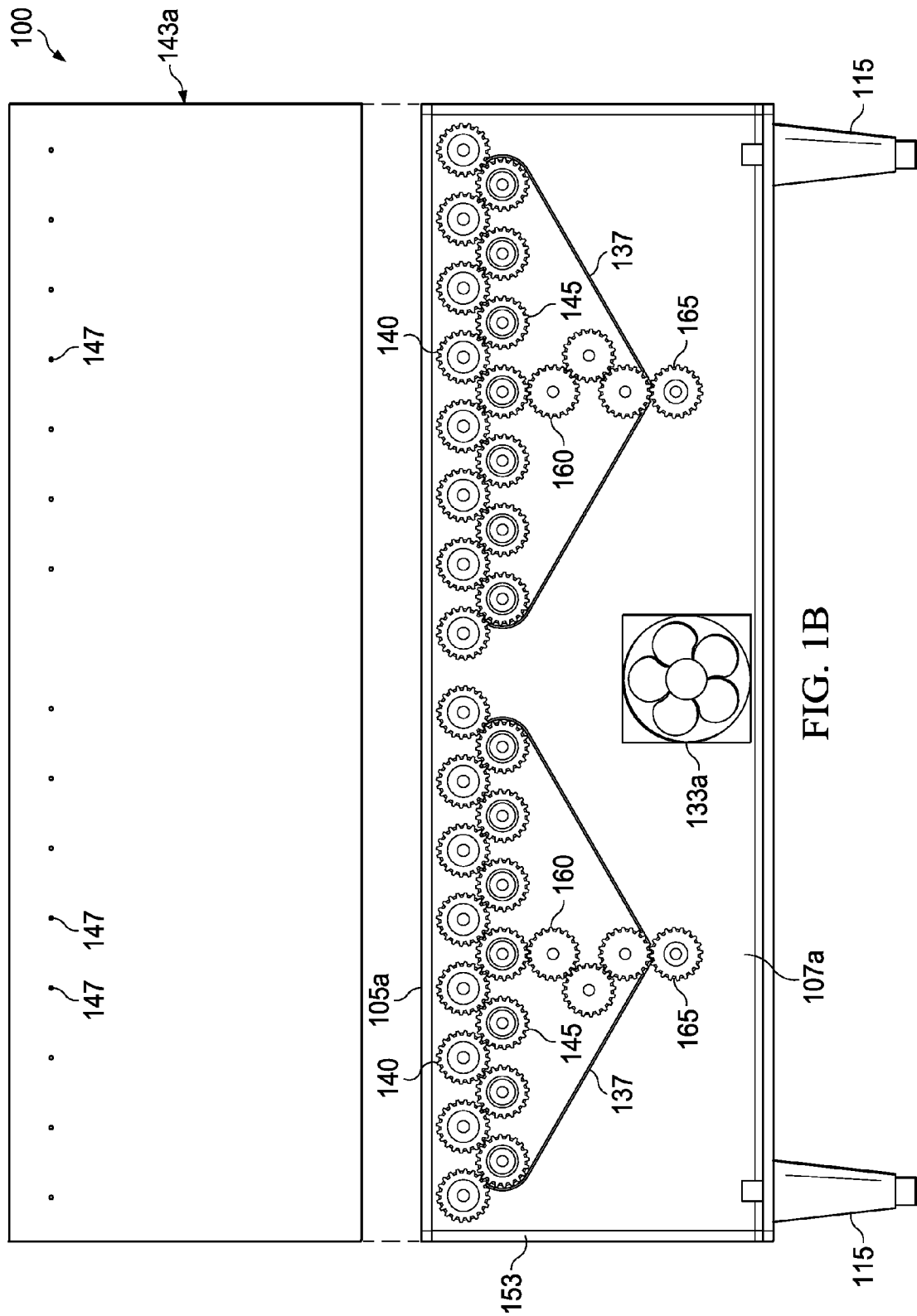

In the illustrated embodiment, one or more plenum plates 137 (two in this example) may be installed in the pressurized plenum 107a. As illustrated, the plenum plates 137 may be substantially triangular in shape and may extend across a portion of a width of the pressurized plenum 107a (as shown in FIG. 1B). The plenum plate 137 may extend from just above a midpoint of a set of idler gears 145 (each set in this example includes seven idler gears 145) downward to just above a midpoint of a transfer gear 160 that is contactingly engaged with a drive gear 165. In some embodiments, the idler gears 145, as well as one or more transfer gears 160, may be mounted to the plenum plate 137. For instance, the gears 145 and 160 may be mounted through a mechanical fastener disposed through an axis of the particular gear and through the plenum plate 137. In alternative embodiments, studs may be mounted (e.g., welded) on to the plenum plate 137 over which the gears 145 and 160 may be mounted. In any event, the gears 145 and 160 may be free-spinning gears mounted to the plenum plate 137 without penetrations through the side housing 105 (e.g., into a sanitary volume below the pre-cooked food product 125).

FIG. 1B illustrates heating elements 151 (e.g., heaters with spade terminals 150a and 150b) to which wires may be coupled and thereby electrically coupled to a power source. The heating elements 151 may, in some embodiments, be an electric resistance heater installed through the heating tube 120 (e.g., all or partially) that may generate heat power to increase a temperature of an outer surface of the heating tube 120. In some embodiments, each heating tube 120 may include an individual heating element 151. Alternatively, heating elements 151 may be installed in every other heating tube 120 (e.g., alternating heating tubes 120) or otherwise.

In the illustrated roller grill 100, the idler gears 145 are mounted below and engaged with the heating tube gears 140. Further, the illustrated roller grill 100 includes a drive gear 165 disposed on a shaft 170 of a motor 175 with a fan 178 (shown in FIG. 1D) that may be mounted in a bottom cavity of the roller grill 100 (defined by the side housings 105a and 105b, the drip plate 180, and the bottom housing 110). The drive gear 165 contactingly engages a transfer gear 160 within a series of transfer gears 160 to transfer rotational motion of the shaft 170 to the transfer gears 160. Although three transfer gears 160 are illustrated in FIG. 1B per drive gear 165, alternative embodiments may include more or fewer transfer gears 160. In some embodiments, one or more of the transfer gears 160 may be helical spur gears (e.g., helical gear 800). Further, although two drive sets are shown (e.g., two drive gears 165 each driven by a motor 175 and in turn drive independent sets of idler gears 145 that are coupled to tube gears 140), other example embodiments may include one drive set or more than two drive sets.

In some aspects, the motor 175 (or motors 175 mounted in the roller grill 100) may be slip gear (or slip clutch) type motors in order to, for example, prevent or help prevent damage to the motor or other components (e.g., one or more gears, belts, chains or otherwise) in the roller grill 100 (or other roller grill described herein). For instance, during cleaning of the drive system of a roller grill (such as one of roller grills 100, 200, 300, or 400), tension may be placed on the drive system by contact with, for instance, the gears, chains, and/or belts. This tension may, in some cases, cause a drive motor to bind, thereby damaging the motor, gears, and/or other components. By using a slip clutch motor, tensions that exceeds an adjustable threshold amount of tension on the motor may cause a rotating shaft of the motor to slip. Thus, a potentially damaging torque transfer to the motor or other components may be avoided.

As illustrated, one of the transfer gears 160 may be engaged with one or more of a plurality of idler gears 145 disposed across a width of the side housing 105. As illustrated, the idler gears 145 may be spaced evenly across the plenum plate 137. The roller grill 100 also includes heating tube gears 140 that are coupled (e.g., inserted into) to respective heating tubes 120. For example, as illustrated, there may be a 1:1 ratio of heating tube gears 140 and heating tubes 120. In some embodiments, one or more of the idler gears 145 and/or heating tube gears 140 may be helical spur gears (e.g., helical gear 800).

The gears 140, 145, 160, and 165 may, in some embodiments, be spur gears. In some embodiments, the gears 140, 145, 160, and 165 may be helical spur gears. In some embodiments, the gears 140, 145, 160, and 165 may be non-metallic, such as, for example, a high-temperature plastic. In some embodiments, for example, one or more gears 140 may be a high-temperature plastic such as, for example, polystyrene, nylon, TEFLON™, polyethylene, polypropylene, polyvinyl chloride, polytetrafluoroethylene (PTFE), and other plastic material) that has a continual duty max temperature rating of between about 250° F. (121° C.) and about 500° F. (260° C.). In some embodiments, for example, one or more gears 145, 160, and/or 165 may be a high-temperature plastic that has a continual duty max temperature rating of between about 120° F. (49° C.) and about 200° F. (93° C.).

In some embodiments, the gears 140, 145, 160, and 165 (and other rollers described herein, such as gears 225 and 230 and pulleys 325a, 330a, as some examples) may be self-lubricating. For example, in some embodiments having non-metallic gears 140, 145, 160, and 165, a material that forms the gears 140, 145, 160, and 165 may be impregnated with or otherwise contain a lubricant material, such as, for example, silicon, or other lubricant material. During operation of the roller grill 100, the lubricant material may exude from one or more of the gears 140, 145, 160, and 165, thereby providing for decreased failure rates due to lack of lubricant between the gears 140, 145, 160, and 165 and other components (e.g., chains, belts, or other components).

With reference to FIGS. 1B and 1D in particular, a cover plate 143a may be slideably mounted over a gasket 153 to at least partially seal the pressurized plenum 107a from an ambient environment. In some other examples, the cover plate 143a may be coupled to the side housing 105a in another manner, such as latches, mechanical fasteners, hinged, spot welding, adhesive, or otherwise. In any event, airflow from the pressurized plenum 107a to an ambient environment may be substantially prevented by the cover plate 143a. As shown, however, the cover plate 143a may include one or more relief openings 147 that allow some airflow to circulate from the pressurized plenum 107a to the ambient environment. The relief openings 147 may be constant sized apertures formed in the cover plate 143a or may be adjustable flow restrictions.

In some aspects, the relief openings 143 may be designed and positioned to help balance air pressures between the pressurized plenum 107a and at least a portion of the inner volumes of the heating tubes 120 (e.g., a portion of a total volume of all tubes 120). For example, in order to maintain a slight positive pressure in the pressurized plenum 107a relative to the inner volumes of the heating tubes 120, a fan 133a may be mounted in the side housing 105a to circulate air from the ambient environment to the pressurized plenum 107a (e.g., from louvered openings in the bottom housing 110). The circulated air may increase an air pressure in the pressurized plenum 107a relative to the ambient environment and also relative to an air pressure of the inner volumes of the heating tubes 120. In some aspects, the higher pressure plenum 107a (relative to the inner volumes of the heating tubes 120 which are open to the plenum 107a) may prevent or help prevent the heat (e.g., generated by the electric resistance heaters 151 positioned in respective interior volumes of the tubes 120) from escaping into the plenum 107a rather than the tube surface and into food product. The relief openings 143 may be designed, therefore, to prevent or help prevent overpressurization of the pressurized plenum 107a by allowing a small amount of airflow to escape the plenum 107a into the environment.

In some aspects, relative temperatures and pressures of the pressurized plenum 107a and the inner volumes of the heating tubes 120 may be quantified through Gay-Lussac's (Amonton's) law, assuming an ideal situation of constant volume for the pressurized plenum 107a and the aggregate individual inner volumes of the heating tubes 120. Gay-Lussac's (Amonton's) law states that a pressure exerted on the sides of a container by an ideal gas of fixed volume is proportional to its temperature. Thus, as temperature within the fixed volume changes, so does pressure according to the equation:

$$\frac{P_1}{T_1} = \frac{P_2}{T_2},$$

where $P_1$ and $T_1$ are pressure and temperature at condition 1, and $P_2$ and $T_2$ are pressure and temperature at condition 2.

With reference to the heating tubes 120, and assuming ambient temperature and pressure (e.g., 75° F. (24° C.) and 14.7 psi (101.3kPa)) at condition 1 (e.g., when the roller grill is not operating), as the temperature in the tubes 120 reaches a design heating temperature of about 240° F. (116° C.) for condition 2 (e.g., when the roller grill has reached a steady state heating operation), the pressure increases to about 47.0 psi (324.1 kPa). With reference to the pressurized plenum 107a, therefore, the pressure in the volume of plenum 107a at condition 2 must be slightly greater than the pressure in the volume of the tubes 120 at condition 2. Raising the pressure in the plenum 107a may occur in part due to a rise in temperature in this volume during steady state operation of the roller grill 100, but may in more part be due to an airflow circulated to this volume by the fan 133a. In some aspects, the fan 133a may circulate about 18 ft³/min ($2 \times 10^{-12}$ m³/s) to the pressurized plenum 107a to generate a positive pressure relative to the volume of the heating tubes 120.

Figure 1C:
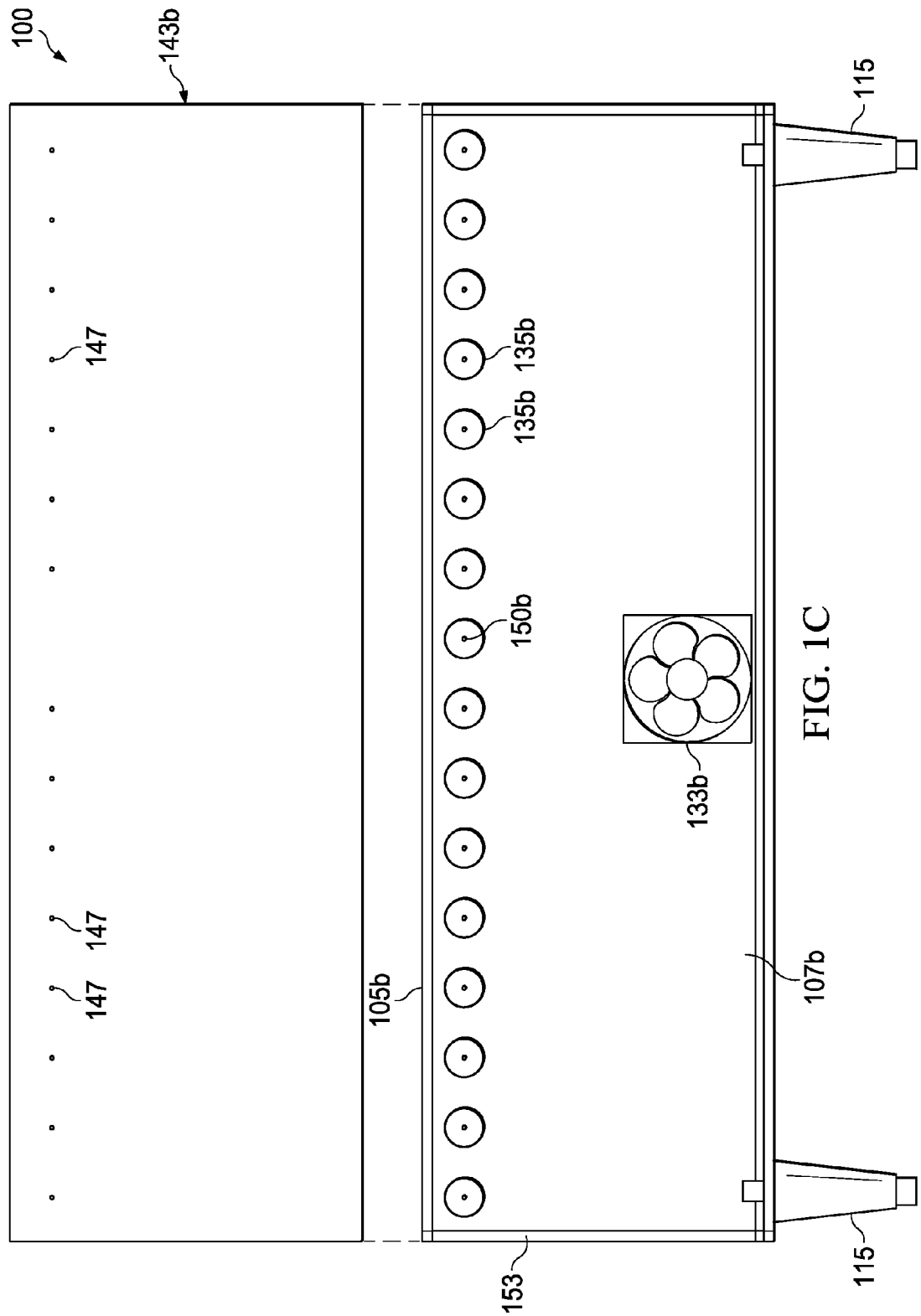

With reference to FIGS. 1C and 1E, which show a non-drive side of the roller grill 100, a cover plate 143b may be slideably mounted over a gasket 153 to at least partially seal the pressurized plenum 107b from an ambient environment. In some other examples, the cover plate 143b may be coupled to the side housing 105b in another manner, such as latches, mechanical fasteners, hinged, spot welding, adhesive, or otherwise. In any event, airflow from the pressurized plenum 107b to an ambient environment may be substantially prevented by the cover plate 143b. As shown, however, the cover plate 143b may include one or more relief openings 147 that allow some airflow to circulate from the pressurized plenum 107b to the ambient environment. The relief openings 147 may be constant sized apertures formed in the cover plate 143b or may be adjustable flow restrictions (e.g., valves, openings with adjustable covers, or otherwise).

In some aspects, the relief openings 143 may be designed and positioned to help balance air pressures between the pressurized plenum 107b, at least a portion of the inner volumes of the heating tubes 120 (e.g., a portion of a total volume of all tubes 120), and/or an ambient environment that surrounds the roller grill 100. For example, in order to maintain a slight positive pressure in the pressurized plenum 107b relative to the inner volumes of the heating tubes 120, a fan 133b may be mounted in the side housing 105a to circulate air from the ambient environment to the pressurized plenum 107b (e.g., from louvered openings in the bottom housing 110). The circulated air may increase an air pressure in the pressurized plenum 107b relative to the ambient environment and also relative to an air pressure of the inner volumes of the heating tubes 120. In some aspects, the higher pressure plenum 107b (relative to the inner volumes of the heating tubes 120) may prevent or help prevent the heat (e.g., generated by the electric resistance heaters 151 positioned in respective interior volumes of the tubes 120) from escaping into the plenum 107b rather than the tube surface and into food product. The relief openings 143 may be designed, therefore, to prevent or help prevent overpressurization of the pressurized plenum 107b by allowing a small amount of airflow to escape the plenum 107b into the environment. As with the description of the relative temperatures and pressure of pressurized plenum 107a described above, the relative temperatures and pressure of pressurized plenum 107b are largely similar.

Turning to FIG. 1E, a side view of a non-drive side of the roller grill 100 is illustrated. In some embodiments, only one side housing 105a may enclose (at least partially) one or more gears and other components of the direct drive assembly. In alternative embodiments, both side housings 105a and 105b may enclose (at least partially) a portion of one or more (e.g., two) direct drive assemblies as described above. For example, there may be two motors 175 per side housing (or one motor 175 per side housing) with each motor 175 driving (e.g., rotating) half of a total number of heating tubes 120 via independent direct drive assemblies. Each independent direct drive assembly may be enclosed within separate side housings 105a and 105b.

In the illustrated example embodiment, the pressurized plenum 107b enclosed by the side housing 105b (shown in FIG. 1E) is substantially free of gears and other direct drive assembly components. As illustrated, the heating tubes 120 may include spade terminals 150b that extend from this end of the tube 120 and may extend through the side housing 105b and be secured to the side housing 105b by a bushing 135b (as described above). The bushing 135b may be sandwiched against an interior surface of the side housing 105b by a retainer plate 190b. In the illustrated embodiment, a cover plate 185b is mounted to the side housing 105b and adjacent the bushing 135b. In some embodiments, a bearing 197 may be mounted between the bushing 135b and the retainer plate 190b so as to, for example, provide a bearing (e.g., wear) surface between the bushing 135b and the retainer plate 190b.

The non-drive side of the roller grill 100 that is shown in FIG. 1E may include a side housing 105b that takes into account expansion of one or more of the components due to heat. For example, the tubes 120 and/or heating elements 151 (as well as spade terminals 150a/150b) may expand during a heating or cooking mode of the roller grill 100. This expansion may be accounted for with, for instance, the bearings 197 do not move but allow the tubes 120 to turn as well as expand axially. Further, the plenum 102b may be sized to account for such expansion.

In operation, the motor 175 of the roller grill 100 may rotate the shaft 170, which in turn rotates the drive gear 165. The drive gear 165, in turn, transfers rotational movement to the transfer gears 160. One of the transfer gears 160 is engaged with one or more of the idler gears 145 such that rotational movement is transferred from the transfer gears 160 to the engaged idler gear 145. The engaged idler gear 145 is also in contacting engagement with at least one of the heating tube gears 140, and transfers rotational movement to the at least one heating tube gear 140. Rotational movement is thus transferred to each of the idler gears 145 and heating tube gears 140, thereby rotating the heating tubes 120.

During (and/or after and/or before) operation of the motor(s) 175, the fans 133a and 133b may circulate air 163, through openings 167, and into the respective pressurized plenums 107a and 107b to increase an air pressure in the respective plenums. The increased pressure in the plenums 107a and 107b may be greater (at least slightly) than a pressure in the heating tubes 120. By increasing the pressure in the plenums 107a and 107b relative to the pressure in the heating tubes 120, heat generated by electric resistance heat 151 in the tubes 120 may not be transferred into the plenums 107a and 107b, or through other components of the grill 100, such as the side housings 105a and 105b. Instead, the heat may be transferred through the heating tubes 120 and to heating surfaces of the tubes 120 that are in contact with the food product 125. In some aspects, as most or almost all of the heat is transferred through the tubes 120 rather than, for example, to the plenums 107a and 107b, the surface temperature of the tubes 120 may be substantially consistent across the tubes 120 and across any particular tube 120. For example, temperature variation between any two particular locations on the tubes 120 may only be between ±2° F. to ±5° F. Further, an air temperature within the pressurized plenums 107a and 107b, as well as of the side housings 105a and 105b, may be kept relatively low (e.g., about 90° F. (32° C.)).

Although roller grill 100 is an example of a roller grill that uses a fan to pressurize a plenum of a side housing, other pressurization devices may be used in place of (or in addition to) a fan that circulates a pressurizing airflow to the plenum. Turning briefly to FIGS. 7A-7D, side views of a portion of the roller grill 100 are shown, each of which includes one or more pressurization devices that can pressurize the plenum 102a as described above. Such pressurization devices may also be used, for instance, in the example embodiments of the roller grills 200, 300, and 400 described below. Although FIGS. 7A-7D only show side views of a drive side of the roller grill 100, similar concepts described and shown in these figures can also be applied to a non-drive side of the roller grill 100 (e.g., as shown in FIG. 1E).

FIG. 7A shows the roller grill 100 with a compressor 700 coupled to the side housing 105a and in fluid communication with the plenum 102a and an ambient environment through louvers 167. The airflow 163 may enter an inlet of the compressor 700 (e.g., centrifugal, scroll, or otherwise), which then raises a pressure of the airflow 163 and circulates the pressurized airflow 163 into the plenum 102a. In some aspects, a pressure limit switch may be part of, or coupled to, the compressor 700, as well as coupled to a pressure sensor 702 (e.g., absolute or differential). The limit switch may, in some aspects, control operation of the compressor 700 (e.g., on, off, speed) based on, for instance, the pressure sensor 702. For instance, if the pressure sensor 702 measures a pressure in the plenum 102a (or difference in pressure between the plenum 102a and another volume of air) that is too large (e.g., an overpressurization event), then the limit switch may reduce a speed of, or turn off, the compressor 700. Similarly, a pressure limit switch can be coupled to the fan 133a (and/or fan 133b) and function as described above.

FIG. 7B shows the roller grill 100 with a compressor 705 coupled to the side housing 105a through a conduit 710 and through an aperture 715, and in fluid communication with the plenum 102a and an ambient environment through louvers 167. The airflow 163 may enter an inlet of the compressor 705, which then raises a pressure of the airflow 163 and circulates the pressurized airflow 163 into the plenum 102a. In some aspects, a pressure limit switch 720 may be part of, or coupled to, the compressor 705, as well as coupled to a pressure sensor 725 (e.g., absolute or differential). The limit switch 720 may, in some aspects, control operation of the compressor 705 (e.g., on, off, speed) based on, for instance, the pressure sensor 725. For instance, if the pressure sensor 725 measures a pressure in the plenum 102a (or difference in pressure between the plenum 102a and another volume of air) that is too large (e.g., an overpressurization event), then the limit switch may reduce a speed of, or turn off, the compressor 705. Although illustrated as within a bottom housing 110 of the roller grill 100, the compressor 705 may also be remote from the roller grill 100 or contained in another portion of the roller grill 100.

FIG. 7C shows the roller grill 100 with a pressurized air tank 740 coupled to the side housing 105a though a conduit 745 and through an aperture 750 and in fluid communication with the plenum 102a. Pressurized air tank 740 may controllably release a flow of pressurized air 163 into the plenum 103a, which then raises a pressure of the plenum 102a. In some aspects, a valve 755 may be part of, or coupled to, the tank 740, as well as coupled to a pressure sensor 760 (e.g., absolute or differential). The valve 755 may, in some aspects, control operation of the tank 740 (e.g., fully open, fully closed, partially open) based on, for instance, the pressure sensor 760. For instance, if the pressure sensor 760 measures a pressure in the plenum 102a (or difference in pressure between the plenum 102a and another volume of air) that is too large (e.g., an overpressurization event), then the valve 755 may close or partially close the pressurized air tank 740. Although illustrated as within a bottom housing 110 of the roller grill 100, the air tank 740 may also be remote from the roller grill 100 or contained in another portion of the roller grill 100.

Figure 7D:
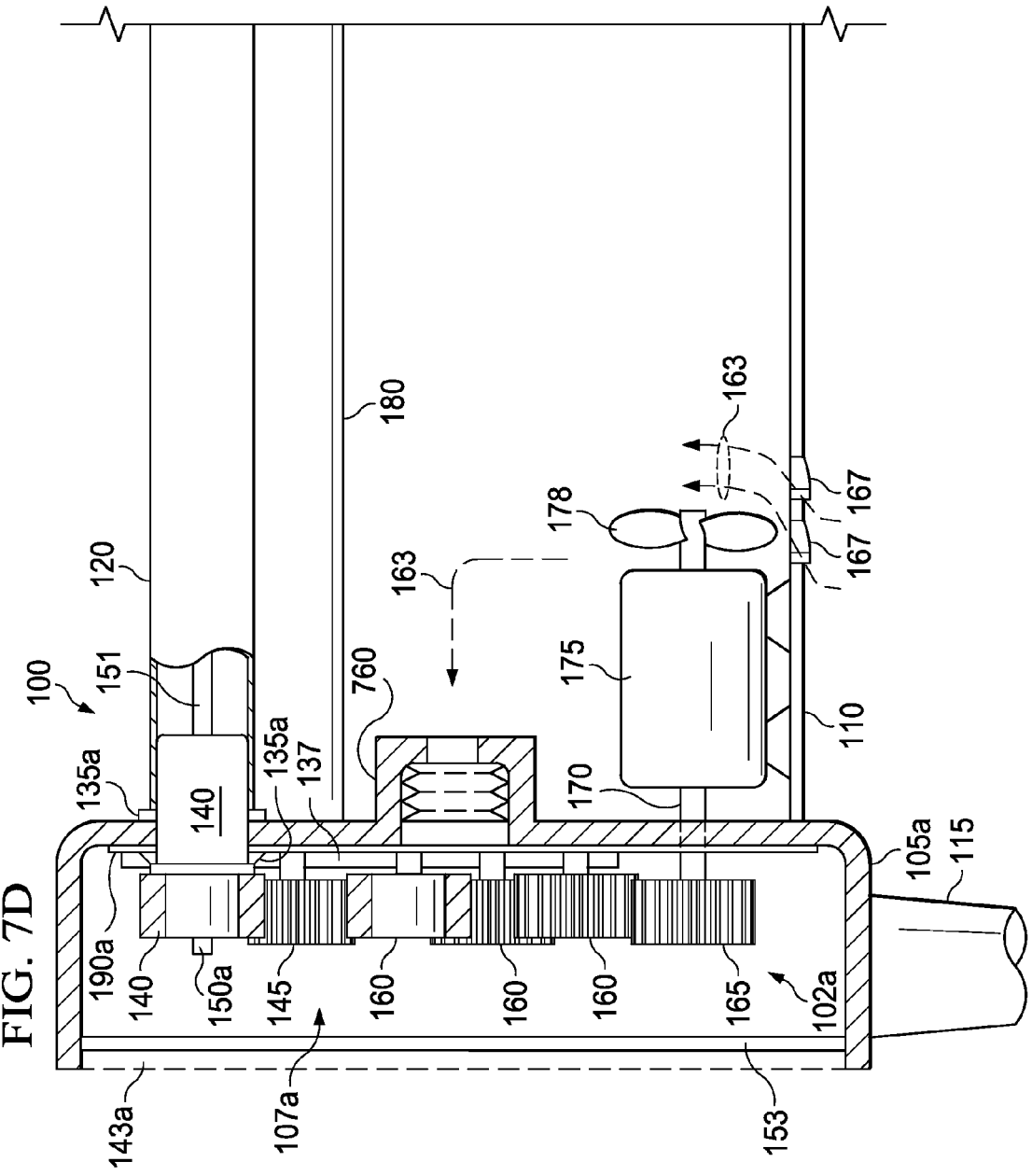

FIG. 7D shows the roller grill 100 with a pump 760 (e.g., a bellows pump or diaphragm, or otherwise) coupled to the side housing 105a and in fluid communication with the plenum 102a and an ambient environment through louvers 167. The airflow 163 may enter an inlet of the pump 760, which then raises a pressure of the airflow 163 and circulated the pressurized airflow 163 into the plenum 102a. In some aspects, a pressure limit switch (not shown) may be part of, or coupled to, the pump 760, as well as coupled to a pressure sensor (e.g., absolute or differential such as the pressure sensor 760). The limit switch may, in some aspects, control operation of the pump 760 (e.g., on, off, speed) based on, for instance, the pressure sensor. For instance, if the pressure sensor measures a pressure in the plenum 102a (or difference in pressure between the plenum 102a and another volume of air) that is too large (e.g., an overpressurization event), then the limit switch may reduce a speed of, or turn off, the pump 760.

Figure 2B:
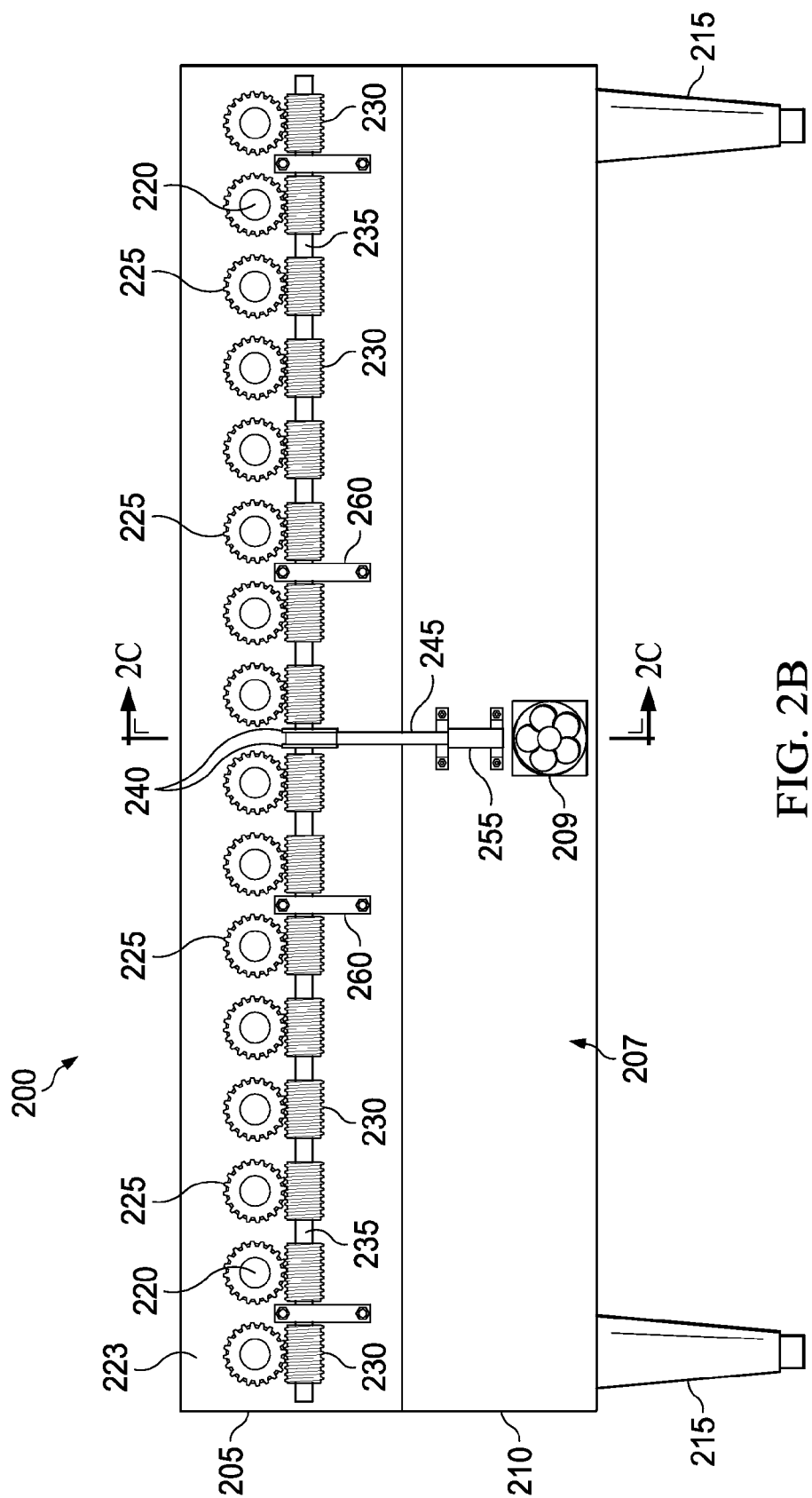
Figure 2C:
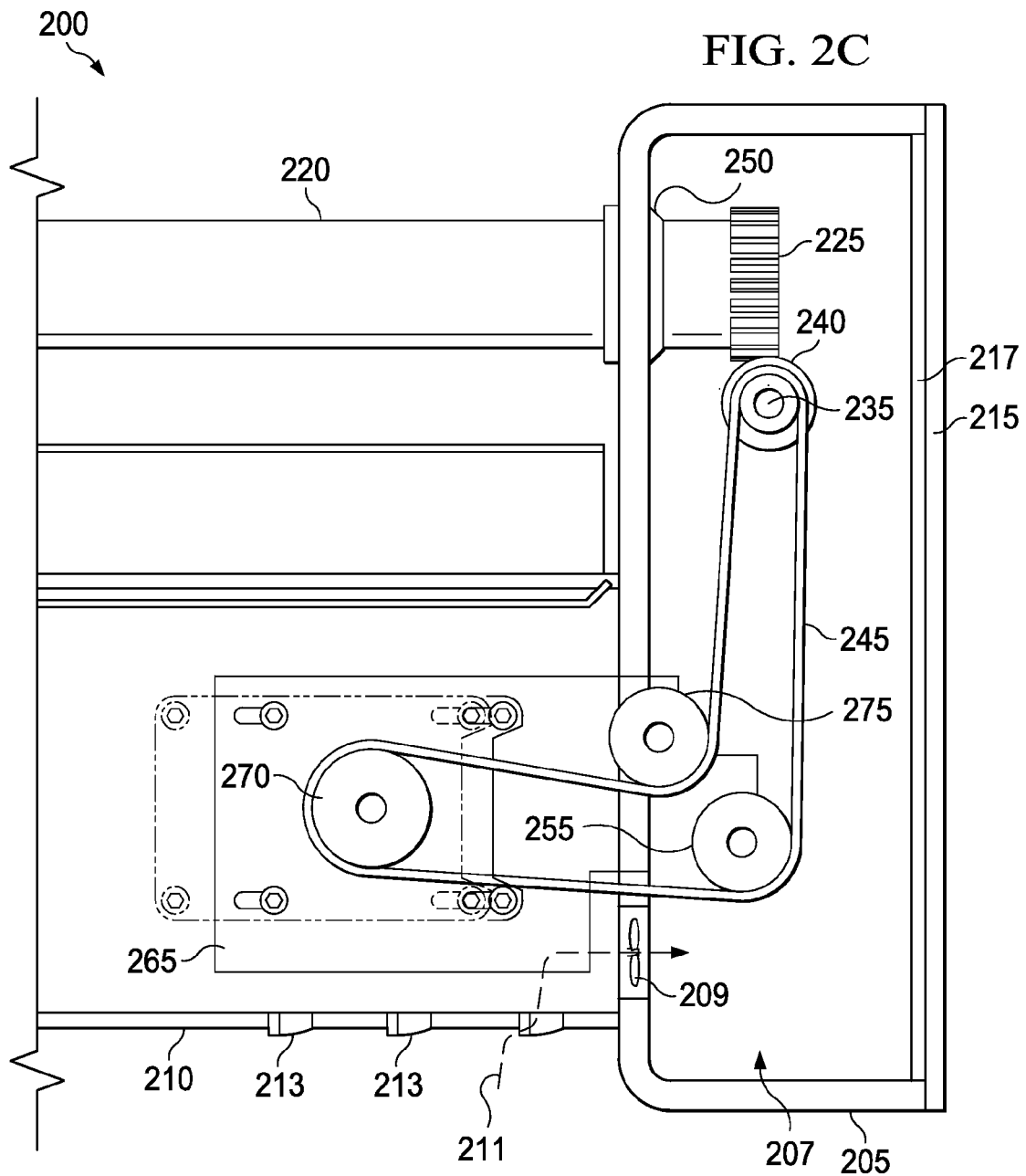

FIGS. 2A-2C illustrate views of an example embodiment of a roller grill 200 that includes one or more pressurized plenums and a belt drive assembly with one or more worm gears. FIG. 2A shows that the roller grill 200 includes a side housing 205 and a bottom housing 210 that is attached to and disposed between lower regions of plates of the side housing 205 and a corresponding side housing on an opposite end of the roller grill 200 (not shown). Referring now to FIG. 2B, the weight of the roller grill 200 is supported by multiple legs 215 that are mounted underneath and near corners of the bottom housing 210.

The roller grill 200 includes a pressurized plenum 207 located, as shown, on a drive side of the grill 200. Another pressurized plenum may be located in a side housing on an opposite side of the roller grill 200 (not shown). A fan 209 may be mounted so as to circulate an airflow 211 into the pressurized plenum 207. As with the roller grill 100, the airflow into the plenum 207 from the fan 209 may pressurize the plenum 207 relative to the heating tubes 220. A side panel 215 may be mounted to the side housing 205, and, as illustrated, against a gasket 217, so as to substantially seal the plenum 207 against undesired airflow into or out of the plenum 207. For instance, the panel 215 may include one or more relief openings sized to balance or help balance pressures in the plenum 207 and the heating tubes 220 (e.g., to provide a slight positive pressure in the plenum 207).

Generally, the operation of the fan 209 and pressurized plenum 207 may be substantially similar to similar components described above with reference to roller grill 100.

FIGS. 2A-2B illustrate the roller grill 200 further including multiple heating tubes 220 that are disposed parallel to one another, across a volume defined between upper regions of opposite panels of the two side housings 205, and above the bottom housing 210. An end of each heating tube 220 extends through a respective hole within the panel of the side housing 205 into a pressurized plenum space 223 provided by the side housing 205. In some embodiments, the width of the pressurized plenum space 223 is approximately 1.625 inches (4.128 cm). Within the pressurized plenum space 223, each heating tube 220 and is engaged with a respective spur gear 225 included within the belt drive assembly. In some examples, each spur gear 225 is mounted in the end of the respective heating tube 220 and is maintained on the end by a respective bushing 250 and/or other components. In some examples, the spur gears 225 may be helical spur gears. Within the pressurized plenum space 223, the spur gears 225 are further engaged with worm gears 230 disposed adjacent (e.g., beneath) the spur gears 225 and mounted on a shaft 235 that extends along at least a portion of the width of the roller grill 200.

In some embodiments, the ratio of spur gears 225 to worm gears 230 is 1:1. In some embodiments, the ratio of spur gears 225 to worm gears 230 is 2:1 or another ratio. In some embodiments, a spur gear 225 may be a helical spur gear. In some embodiments, a worm gear 230 may be a screw worm gear. In some embodiments, the shaft 235 may be coupled to the side housing 205 by one or more bearing blocks 260.

FIG. 2C illustrates that the shaft 235 is further coupled to a timing pulley 240 having multiple teeth disposed on a cylindrical surface that engage multiple teeth protruding from a surface of a timing belt 245. The timing belt 245 sequentially engages multiple components of the belt drive assembly that may be fully or partially disposed within the bottom housing 210 of the roller grill 200. For example, such components include, as illustrated, a first pulley 255, a timing gear 270 having multiple teeth disposed on a circumferential surface and mounted on a shaft of a motor 265, and a second pulley 275 disposed vertically higher than the first pulley 255. In some examples, one or both of the pulleys 255 or 275 can be a timing pulley (i.e., with a grooved circumferential surface). In some examples, one or both of the pulleys 255 or 275 may have substantially smooth outer cylindrical surfaces.

During operation of the roller grill 200, the motor 265 generates rotary motion of the heating tubes 220 by using the timing belt 245 to transfer rotary motion to the worm gears 230 engaged with the spur gears 225. Power generated by the motor 265 drives rotation of the timing gear 270 mounted on the shaft of the motor 265, which, by engagement of the teeth disposed on the surface of the timing gear 270 with the teeth protruding from the surface of the timing belt 245, drives rotation of the timing belt 245. Thus, in the illustrated embodiment, the timing belt 245 extends from the bottom housing 210 through the panel of the side housing 205 and into the pressurized plenum space 223 provided by the side housing 205 to engage the timing pulley 240. Alternatively, the motor 265 may be mounted elsewhere in or on the roller grill 200 (e.g., in the pressurized plenum space 223 or otherwise).

Engagement of the teeth protruding from the surface of the timing belt 245 with teeth disposed on the surface of the timing pulley 240 drives rotation of the timing pulley 240, which in turn rotates the shaft 235. Rotary motion of the shaft 235 drives rotation of the worm gears 230, which consequently drives rotation of the spur gears 225 due to their engagement with the worm gears 230, and further drives rotation of the heating tubes 220 that are coupled to the spur gears 225.

In some embodiments, one motor 265 may be coupled to two belt drive assemblies located at opposing sides of the roller grill 200. In some embodiments, a first motor 265 may be coupled to a first belt drive assembly located at a first side of the roller grill 200, while a second motor 265 may be coupled to a second belt drive assembly located at a second side of the roller grill 200. In other embodiments, there may be two (or more) belt drive assemblies, with each assembly driving a subset of a total number of heating tubes 220 of the roller grill 200. Each belt drive assembly may drive the corresponding subset of heating tubes 220 from the same end of the roller grill 200 or from opposed ends.

Figure 3A:
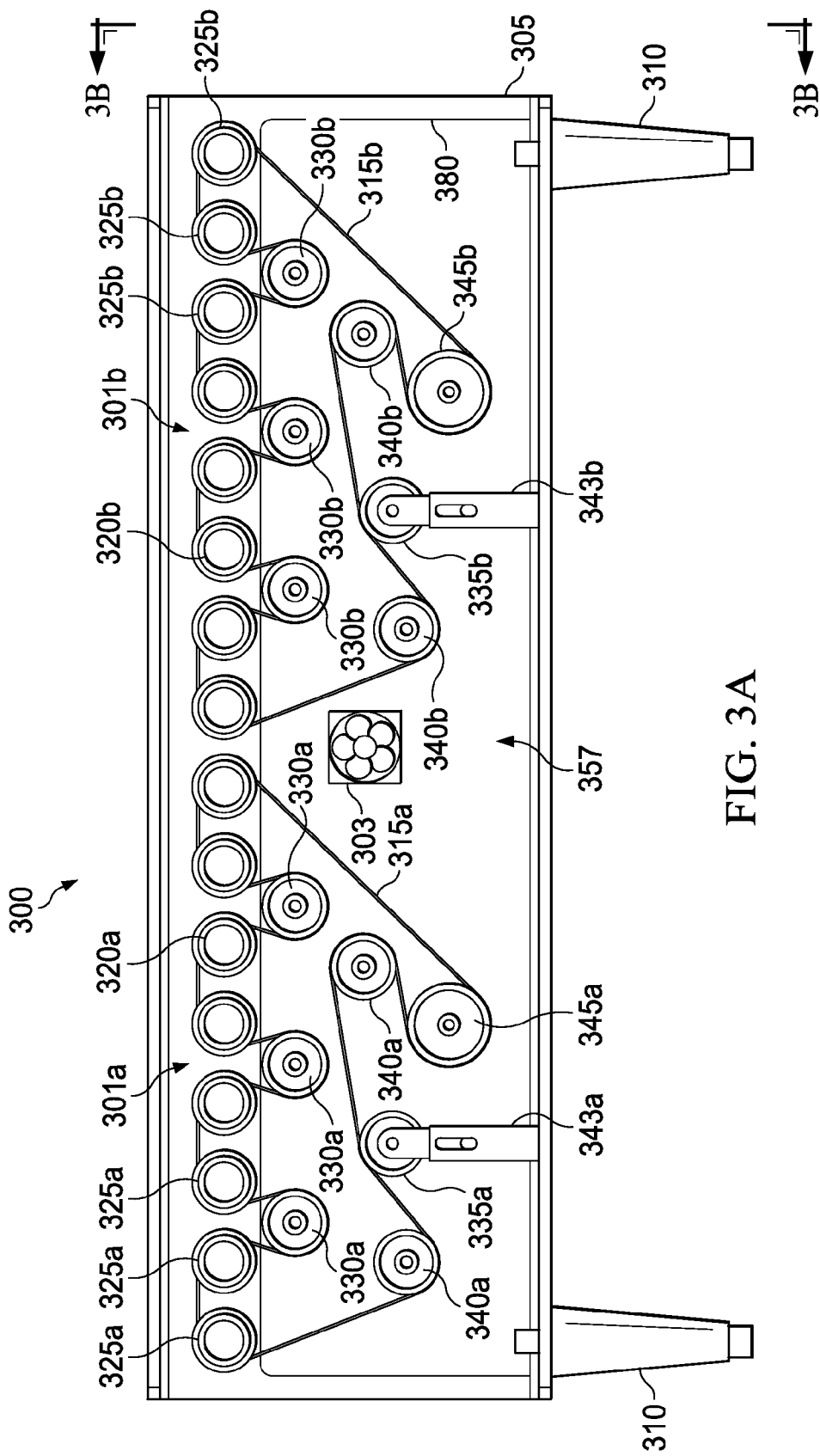
FIGS. 3A-3B illustrate views of another example embodiment of a roller grill that includes a belt drive system and one or more pressurized plenums.
Figure 3B:
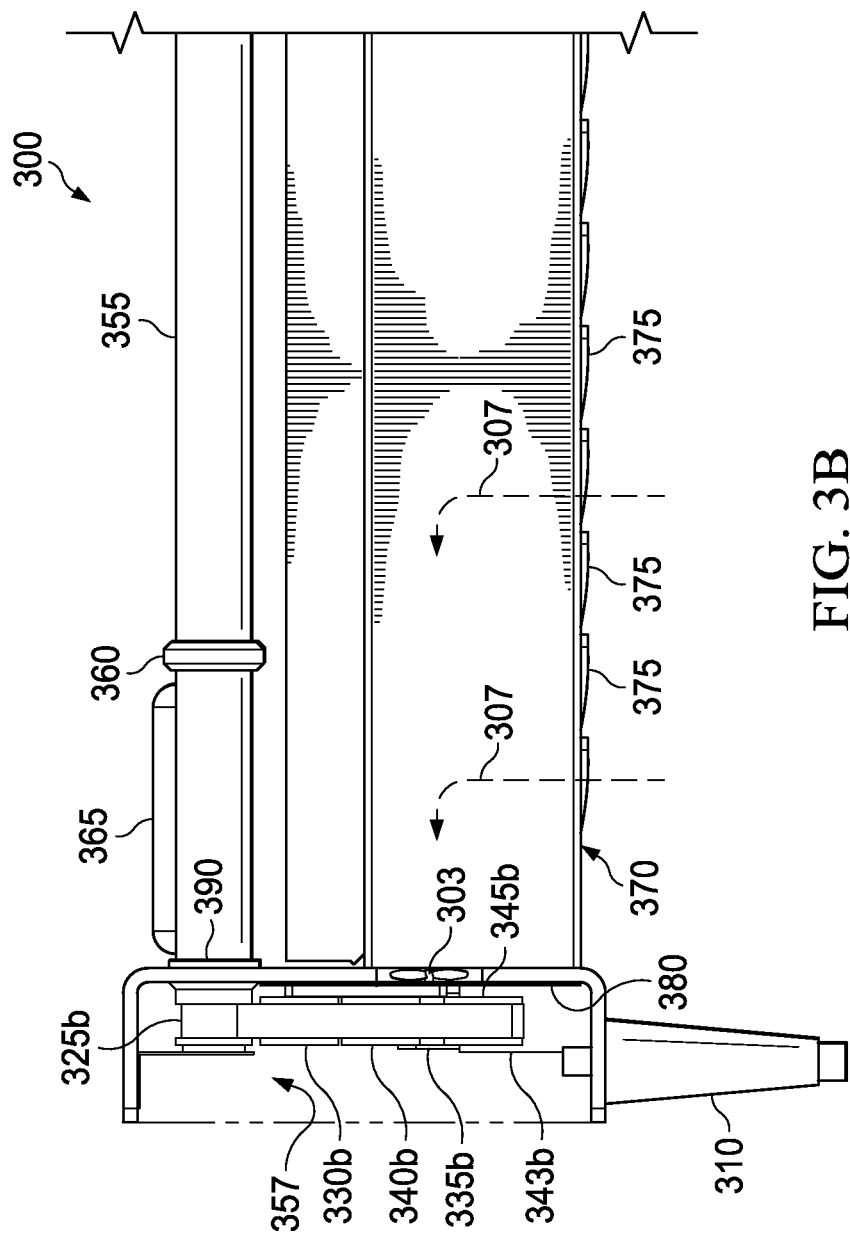

FIGS. 3A-3B illustrate views of another example embodiment of a roller grill 300 that includes a belt drive assembly and one or more pressurized plenums. The roller grill 300 includes a side housing 305 and a bottom housing 370 that is attached to and disposed between lower regions of panels of the side housing 305 and a corresponding side housing on an opposite end of the roller grill 300 (not shown). The weight of the roller grill 300 is supported by multiple legs 310 that are mounted underneath and near ends of the bottom housing 370. The roller grill 300 further includes multiple heating tubes 355 that are disposed parallel to one another, across a defined volume between upper regions of opposite panels of the two side housings 305, and above the bottom housing 370. The heating tubes 355 are further positioned sufficiently close to one another so as to allow a pre-cooked food product 365 to simultaneously rest atop two adjacent heating tubes 355. One or more annular shaped dividers 360 may be mounted on each heating tube 355 in order to prevent contact between two pre-cooked food products 365 positioned along common heating tubes 355 or to restrict lateral movement of a pre-cooked food product 365 resting atop the heating tubes 355.

The roller grill 300 includes a pressurized plenum 357 located, as shown, on a drive side of the grill 300. Another pressurized plenum may be located in a side housing on an opposite side of the roller grill 300 (not shown). A fan 303 may be mounted so as to circulate an airflow 307 into the pressurized plenum 357. As with the roller grill 100, the airflow 307 into the plenum 357 from the fan 303 may pressurize the plenum 357 relative to the heating tubes 355. A side panel (not shown) may be mounted to the side housing 305 so as to substantially seal the plenum 357 against undesired airflow into or out of the plenum 357. For instance, a panel may include one or more relief openings sized to balance or help balance pressures in the plenum 357 and the heating tubes 355 (e.g., to provide a slight positive pressure in the plenum 357). Generally, the operation of the fan 303 and pressurized plenum 357 may be substantially similar to similar components described above with reference to roller grill 100.

In some embodiments, an end of each heating tube 355 extends through a respective hole within the panel of the side housing 305 into a pressurized plenum space 357 provided by the side housing 305, where the heating tubes 355 are coupled to one or more belt drive assemblies. In this example, the roller grill 300 includes two belt drive assemblies, a first belt drive assembly 301a and a second belt drive assembly 301b. In alternative embodiments, however, the roller grill 300 may include only one belt drive assembly or multiple (e.g., two or more) belt drive assemblies. The first belt drive assembly 301a includes, as illustrated, a timing belt 315a, multiple timing pulleys 325a, multiple upper idler pulleys 330a, two lower idler pulleys 340a, a tensioning pulley 335a, and a timing gear 345a. However, in alternative embodiments, the first belt drive assembly 301a may include more or fewer of these listed components. The second belt drive assembly 301b includes, as illustrated, a timing belt 315b, multiple timing pulleys 325b, multiple upper idler pulleys 330b, two lower idler pulleys 340b, a tensioning pulley 335b, and a timing gear 345b. However, in alternative embodiments, the second belt drive assembly 301b may include more or fewer of these listed components.

In the illustrated embodiment, the timing belts 315a and 315b include teeth protruding from a circumferential surface that are adapted to engage teeth disposed on a surface of one or more corresponding timing pulleys 325a, 325b. The timing belts 315a and 315b are secured on the one or more corresponding timing pulleys 325a and 325b by one or more bushings 320a and 320b. Alternatively, one or both of the timing belts 315a and 315b may be smooth belts, with no teeth or other protrusions on a circumferential surface.

In some embodiments, the teeth protruding from a first surface of the timing belt 315a, 315b engage the teeth disposed on the surface of one or more timing pulleys 325a, 325b alternate with a second surface of the timing belt 315a, 315b engaging one or more upper idler pulleys 330a, 330b. Following engagement of the timing belt 315a, 315b with the one or more timing pulleys 325a, 325b and the one or more upper idler pulleys 330a, 330b, the teeth protruding from the surface of the timing belt 315a, 315b engage teeth disposed on a surface of a tensioning pulley 335a, 335b, which may be mounted on a vertically adjustable, spring-loaded bracket assembly 343a, 343b. The bracket assembly 343a, 343b allows the tensioning pulley 335a, 335b to be adjusted vertically, thereby further allowing adjustment of tension in the timing belt 315a, 315b. In some embodiments, the roller grill 300 may not include the tensioning pulley 335a, 335b and the bracket assembly 343a, 343b.

In some embodiments, the belt drive assemblies 301a and 301b can include one or more lower idler pulleys 340a, 340b. Following engagement of the teeth protruding from the surface of the timing belt 315a, 315b with the teeth disposed on the surface of the tensioning pulley 335a, 335b, the teeth protruding from the surface of the timing belt 315a, 315b engage teeth disposed on the surface of the timing gear 345a, 345b. The timing gear 345a, 345b may be coupled to a motor (not shown) located in the bottom housing 370 of the roller grill 300 that drives rotary motion of the timing belt 315a, 315b.

In some embodiments, one or more of the upper idler pulleys 330a, 330b may be coupled to a plenum plate 350, which can serve as a heat sink that transfers heat away from the timing belt 315a, 315b and timing pulleys 325a, 325b.

In some embodiments, a louver 375 may be disposed along the bottom surface of the bottom housing 370, allowing cool air to pass into the bottom housing 370 and cool the motor and any other drive components disposed within the bottom housing.

Referring now to FIG. 3B, in some embodiments, a plenum plate 380 may be attached to each side housing 305, with the plenum 357. Various components of the drive assembly, such as, for example, the timing gears 345a and 345b, the idler pulleys 340a and 340b, and other components, may be mounted on (e.g., via mechanical fasteners) on the plenum plate 380. The plenum plate 380 may further serve as a heat transfer surface that absorbs heat radiated from the heating tubes 355 and the drive assembly components, thereby transferring heat away from the drive assembly components. In some embodiments, the plenum plate 380 may include one or more ventilation holes 395 allowing fluid (e.g., airflow) communication between the pressurized plenum 357 and a volume defined underneath the heating tubes 355 and within the bottom housing 210. Such airflow may also be communicated through the louvers 375. The roller grill 300 may also include multiple bushings 390 that are respectively mounted over the ends of the multiple heating tubes 355 and that, for example, prevent the timing pulleys 325a, 325b from moving inward on the multiple heating tubes 355. Further, the bushings 390, which may be similar to, for instance, the bushing 900 shown in FIG. 9A, may provide a bearing surface for the heating tubes 355 to rotate within during operation of the roller grill 300. In some examples, the plenum plate 380 may have a thermal conductivity that is greater than or equal to 200 Btu/(hr·ft °F.) (346 W/(m K)) at a temperature of 250° F. (121° C.).

During operation of the roller grill 300, one or more motors (located within the bottom housing 370, not shown in FIGS. 3A-3B) drive rotation of the heating tubes 355 via the belt drive assemblies 301a, 301b. In some embodiments, a single motor may drive both belt drive assemblies 301a, 301b. In other embodiments, each belt drive assembly 301a, 301b (and other belt drive assemblies), may each be driven by a dedicated motor.

Power generated by the motor drives rotation of the timing gear 345a, 345b mounted on a shaft (not shown in FIGS. 3A-3B) of the motor, which, by engagement of the teeth protruding from the surface of the timing belt 315a, 315b with teeth disposed on the surface of the timing gear 345a, 345b, drives rotary motion of the timing belt 315a, 315b. Engagement of teeth protruding from the surface of the timing belt 315a, 315b with teeth disposed on the surface of the timing pulleys 325a, 325b further provides rotary motion to the timing pulleys 325a, 325b, which consequently rotate the heating tubes 355. Engagement of the teeth protruding from the timing belt 315a, 315b with teeth and surface of the timing belt 315a, 315b disposed on the surface of the idler pulleys 330a, 330b, 340a, 340b and the tensioning pulley 335a, 335b, further rotates the idler pulleys 330a, 330b, 340a, 340b and the tensioning pulley 335a, 335b, respectively.

In some embodiments, the arrangement of the timing pulleys 325a, 325b and one or more of the idler pulleys 330a, 330b, 340a, 340b, the tensioning pulley 335a, 335b, and the timing gear 345a, 345b creates a series of alternating timing belt heating cycles and timing belt cooling cycles, respectively. In some embodiments, the timing belt heating cycles are provided by heat radiated from the timing pulleys 325a, 325b. When heat is generated within the heating tubes 355 by, for example, electric resistive heating elements, the heat is transferred to various components of the roller grill assembly 300, including the bushings 390 and the timing pulleys 325a, 325b. As the timing belt 315a, 315b engages with the timing pulleys 325a, 325b, the timing belt 315a, 315b absorbs heat from the timing pulleys 325a, 325b (i.e., the timing pulleys 325a, 325b transfer heat to the timing belt 315a, 315b).

In some embodiments, the timing belt 315a, 315b may be made from low heat conducting material. For example, the timing belt 315a, 315b may be insulated from the transfer of heat from, for instance, the heating tubes 355 through the timing pulleys 325a, 325b.

In some embodiments, the timing belt cooling cycles are provided by heat absorbed by one or more of the idler pulleys 330a, 330b, 340a, 340b, the tensioning pulley 335a, 335b, and the timing gear 345a, 345b. For example, as the timing belt 315a, 315b engages with the idler pulleys 330a, 330b, 340a, 340b, the idler pulleys 330a, 330b, 340a, 340b absorb heat from the timing belt 315a, 315b (i.e., the idler pulleys 330a, 330b, 340a, 340b transfer heat away from the timing belt 315a, 315b). In some embodiments, the roller grill 300 may not include the lower idler pulleys 340a, 340b or the tensioning pulley 335a, 335b. Thus, in some embodiments, the presence of one or more of the idler pulleys 330a, 330b, 340a, 340b and the tensioning pulley 335a, 335b may determine the length and total cooling effect of the cooling cycle.

In some examples, the thermal conductivity of the timing pulleys 325a, 325b is less than that of one or more of the idler pulleys 330a, 330b, 340a, 340b, the tensioning pulley 335a, 335b, and the timing gear 345a, 345b. For example, in some embodiments, the thermal conductivity of the timing pulleys 325a, 325b may be less than or equal to 17 Btu/(hr·ft·° F.) (29 W/(m K)) at a temperature of 250° F. (121° C.), while the thermal conductivity of one or more of the idler pulleys 330a, 330b, 340a, 340b, the tensioning pulley 335a, 335b, and the timing gear 345a, 345b may be greater than or equal to 200 Btu/(hr·ft·° F.) (346 W/(m K)) at a temperature of 250° F. (121° C.). In some instances, the cooling cycle can drop the temperature of the timing belt 315a, 315b by up to 50° F. (10° C.). In some examples, the alternating heating cycles and cooling cycles may extend the life of the timing belt 315a, 315b. For example, the cooling cycle may provide the timing belt 315a, 315b with a life of up to six years, whereas a drive chain, in contrast, may need to be changed once per year.

In some embodiments, the timing pulleys 325a, 325b may be a low heat conductive material, such as plastic. In some embodiments, the idler pulleys 330a, 330b may be a high heat conductive material, such as aluminum. In some embodiments, the idler pulleys 340a, 340b may be a low heat conductive material, such as plastic. In some embodiments, the timing gear 345a, 345b may be a high heat conductive material, such as aluminum.

Figure 4:
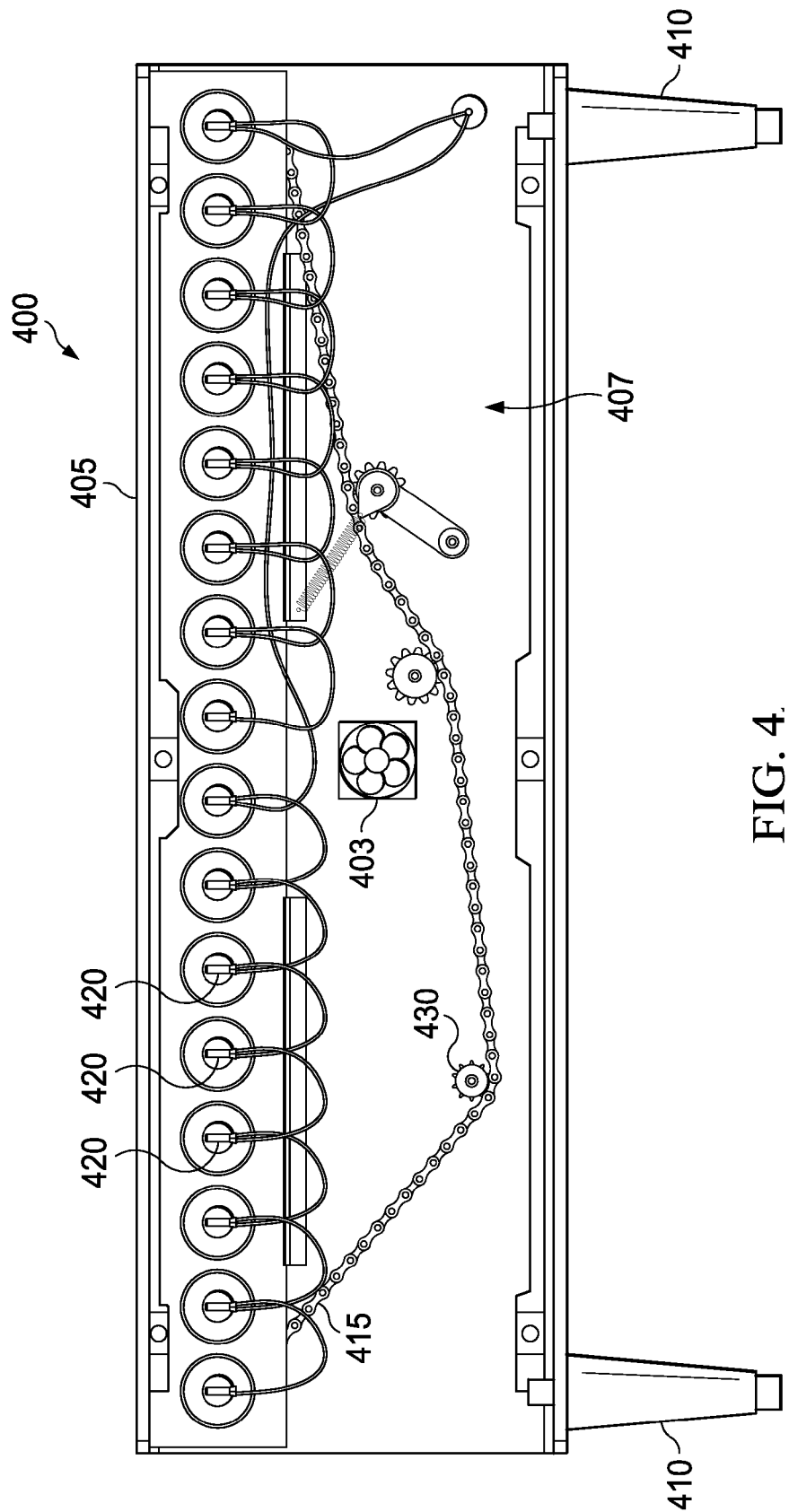
FIG. 4 illustrates a side view of an example embodiment of a roller grill that includes a belt drive system and one or more pressurized plenums.

FIG. 4 illustrates a side view of an example embodiment of a roller grill 400 that includes a chain drive assembly and one or more pressurized plenums. The roller grill 400 includes two side housings 405 (one shown in FIG. 4), and the weight of the roller grill 400 is supported by multiple legs 410 that are mounted underneath and near corners of a bottom housing. The roller grill 400 also includes multiple heating tubes and multiple sprockets 420 that are respectively coupled to ends of the multiple heating tubes. In some embodiments, a chain 415 provides rotary motion to the heating tubes by engaging the sprockets 420. The chain 415 is driven by one or more motors within a bottom housing of the roller grill 400 (not shown in FIG. 4) as the chain 415 engages a drive gear 430 coupled to the motor. In this example, the roller grill 400 includes one chain drive assembly; however, in alternative embodiments, the roller grill 400 may include more than one chain drive assembly.

In some embodiments, one motor may be coupled to two chain drive assemblies located at opposing sides of the roller grill 400. In some embodiments, a first motor may be coupled to a first chain drive assembly located at a first side of the roller grill 400, while a second motor may be coupled to a second chain drive assembly located at a second side of the roller grill 400.

The roller grill 400 includes a pressurized plenum 407 located, as shown, on a drive side of the grill 400. Another pressurized plenum may be located in a side housing on an opposite side of the roller grill 400 (not shown). A fan 403 may be mounted so as to circulate an airflow into the pressurized plenum 407. As with the roller grill 100, the airflow into the plenum 407 from the fan 403 may pressurize the plenum 407 relative to the heating tubes of the roller grill 400. A side panel (not shown) may be mounted to a side housing so as to substantially seal the plenum 407 against undesired airflow into or out of the plenum 407. For instance, a panel may include one or more relief openings sized to balance or help balance pressures in the plenum 407 and the heating tubes of the roller grill 400 (e.g., to provide a slight positive pressure in the plenum 407). Generally, the operation of the fan 403 and pressurized plenum 407 may be substantially similar to similar components described above with reference to roller grill 100.

Figure 5A:
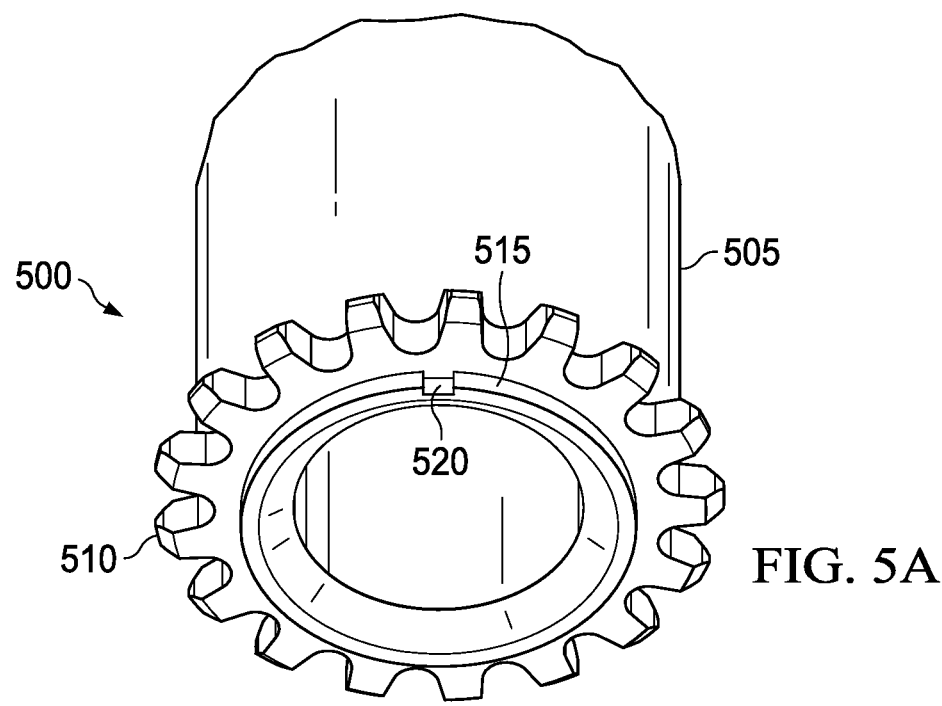
FIGS. 5A-5B illustrate views of example embodiments of a roller grill tube in accordance with the present disclosure.
Figure 5B:
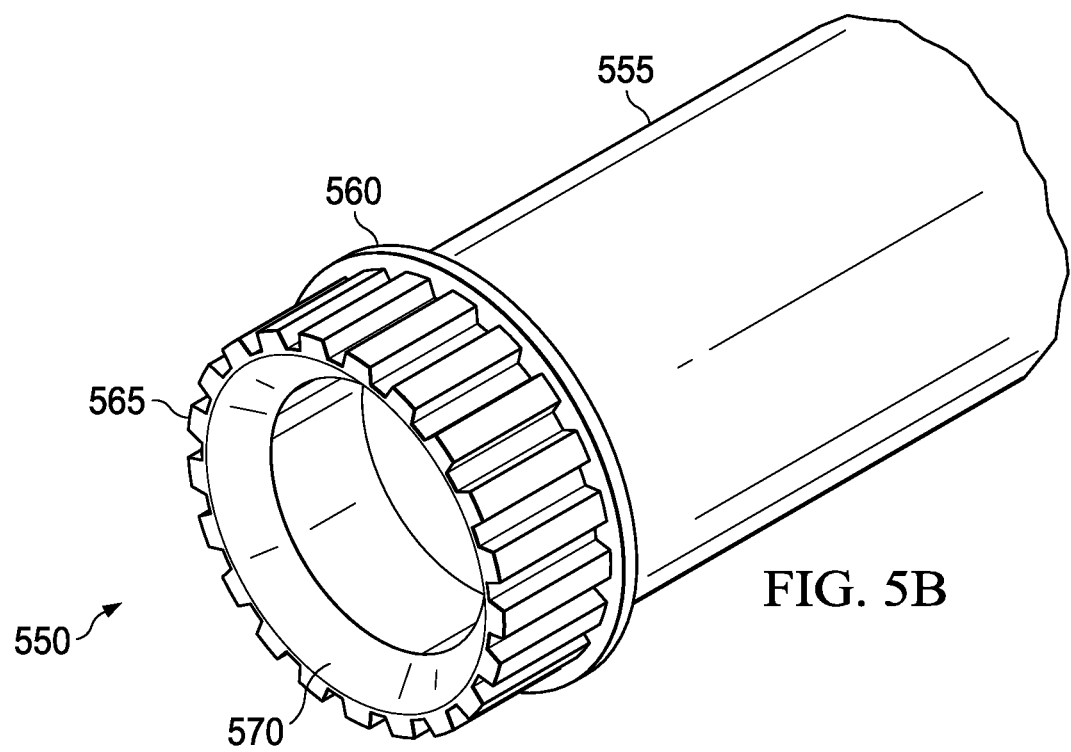

FIGS. 5A-5B illustrate views of example embodiments of a roller grill tube assembly 500, 550 that may be used with a roller grill, such as one or more of roller grills 100, 200, 300 and/or 400. Referring now to FIG. 5A, in some embodiments, a roller grill tube assembly 500 includes a heating tube 505, a sprocket 510 coupled to an end of the heating tube 505, and a bushing 515. In some embodiments, the sprocket 510 is installed over the heating tube 505 (e.g., press fit over the tube 505). In some embodiments, the bushing 515 may be a bearing inserted into the sprocket 510 that acts as a thrust bearing that prevents (all or partially) metal-to-metal contact between the sprocket 510 and other metal components of a roller grill.

In some examples, the sprocket 510 may allow the roller grill tube assembly 500 to operate with a roller grill utilizing a chain drive assembly, such as the roller grill 400. During operation of a roller grill, the bushing 515 provides a surface to transfer heat away from the heating tube 505 and the sprocket 510, thereby reducing the wear of the sprocket 510 and a chain (e.g., the chain 415) engaged with the sprocket 510. In some embodiments, the bushing 515 can include a notch 520 that engages with a ridge of the heating tube 505 or a ridge of the sprocket 510 to prevent or reduce slippage of the bushing 515. In some examples, the bushing 515 is a TEFLON™ bushing.

Referring now to FIG. 5B, in some embodiments, a roller grill assembly 550 may include a heating tube 555, a pulley flange 560 coupled to an end of the heating tube 555, a timing pulley 565 coupled to the end of the heating tube 555, and a bushing 570. The bushing 570 may, in some embodiments, extend past the timing pulley 565 to contact a retainer plate (not shown), such as, for instance, the cover plate 280. In some embodiments, the bushing 570 may be TEFLON™ or another bearing material. In some embodiments, the timing pulley 565 may allow the roller grill tube assembly 550 to operate with a roller grill utilizing a belt drive assembly, such as the roller grill 300. In some examples, the pulley flange 560 may prevent the timing pulley 565 from sliding inward on the heating tube 555. In some examples, the pulley flange 560 is made of plastic (e.g., TEFLON™) or steel (e.g., stainless or carbon).

FIGS. 6A-6D illustrate an example helical gear 600 that may be used in a roller grill, such as, for example, the roller grill 200 illustrated in FIGS. 2A-2D. In some embodiments of the roller grill 200, for instance, the helical gear 600 may be coupled to a heating tube 220 (or other heating tube) and used to drive (e.g., rotate) the heating tube 220. For example, the helical gear 600 may be driven by the spur gear 225 and mounted on the shaft 235.

As illustrated, the helical gear 600 includes an outer diameter surface 610 coupled to (e.g., attached to or integral with) a gear head 605 having multiple teeth 615 disposed around an outer surface of the gear head 605. A bore 620 extends through the gear head 605 and outer diameter surface 610 and shares a centerline with the gear head 605 and the outer diameter surface 610. As illustrated, the teeth 615 may be angled to form a helical gear (e.g., at about a 5° angle offset). In some embodiments, there may be 21 teeth 615, with each tooth 615 having a pitch diameter of about 1.2 inches (3.1 cm), an outside diameter of about 1.3 inches (3.3 cm), a root diameter of about 1.1 inches (2.7 cm), and a tooth thickness at the pitch diameter of about 0.1 inches. Further, in some embodiments, the diameter of the bore 620 is about 0.75 inches (1.9 cm).

Figures 6A, 6B:
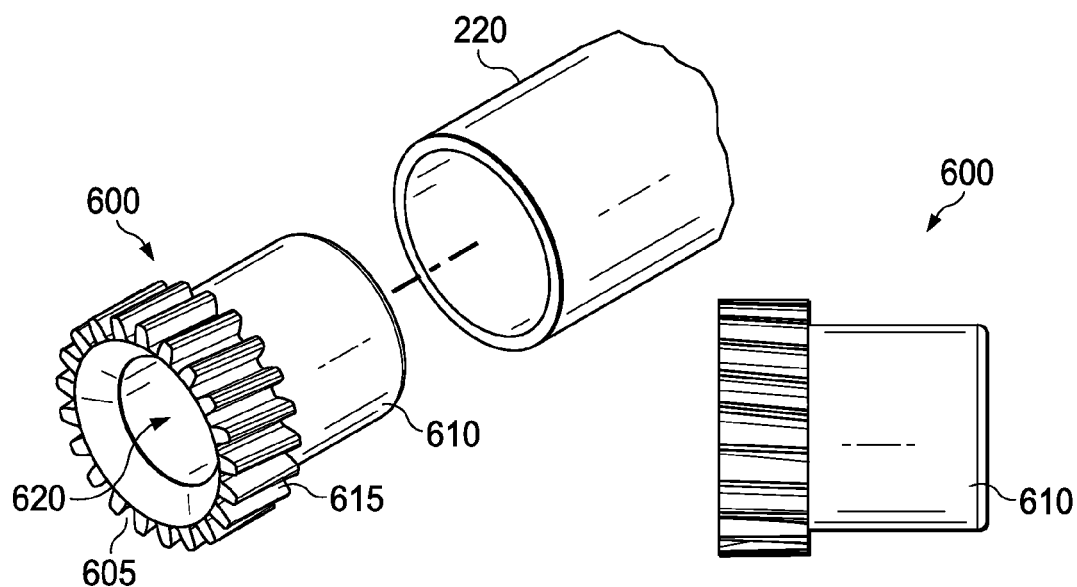
FIGS. 6A-6D illustrate an example worm gear that may be used in a roller grill according to the present disclosure.
Figures 6C, 6D:
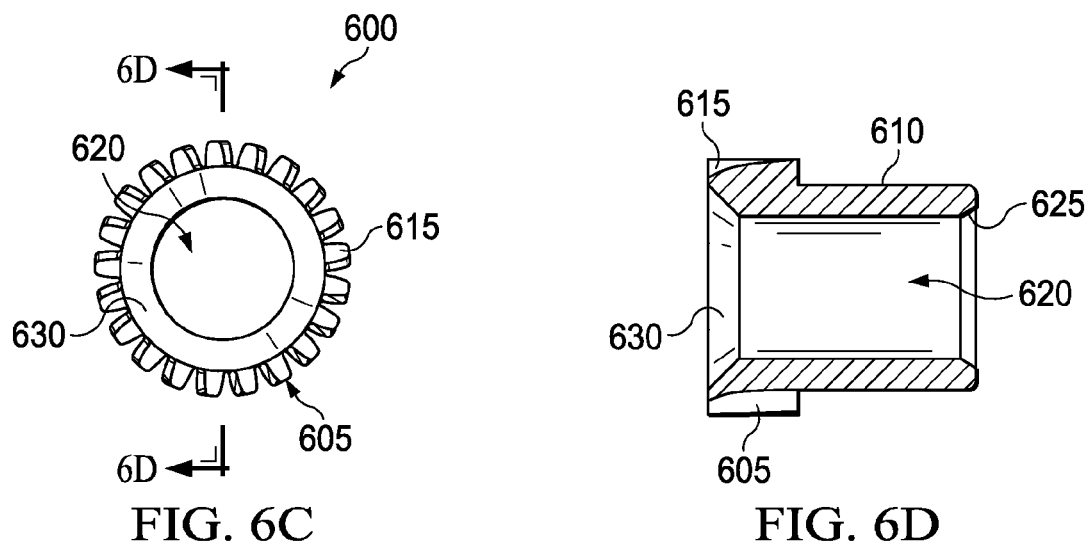

As illustrated in FIG. 6D, an end of the helical gear 600 that may be coupled to a heating tube includes a beveled surface 625 around a circumference of the outer diameter surface 610. In some embodiments, the beveled surface 625 may be set-off at an angle of about 30° from an interior surface of the outer diameter surface 610. Alternatively, other angular offsets are possible. In some embodiments, the beveled surface 625 may allow a heating element to be more easily inserted through the helical gear 600 from the heating tube 220.

As further illustrated in FIG. 6D, the gear head 605 also includes a beveled surface 630 around a circumference of the gear head 605. In some embodiments, the beveled surface 630 may be set-off at an angle of about 45° from an interior surface of the gear head 605. Alternatively, other angular offsets are possible. In some embodiments, a retainer or cover plate (such as the retainer plate 930) may include a concave portion 935 that protrudes into the gear head 605 adjacent the beveled surface 630. Thus, there may be more space allowed for wiring coupled to a heating element passing through the heating tube 220.

In some embodiments, the helical gear 600 may be coupled to the heating tube 220 (or another heating tube) as follows. First the outer diameter surface 610 may be inserted (e.g., all or partially) into the heating tube 220 until an end of the heating tube 220 is at or adjacent the gear head 605. Next, the heating tube 220 may be punched into the outer diameter surface 610 (e.g., by compressing the heating tube 220 into the outer diameter surface 610 and/or inserting a davit (not shown) through the heating tube 220 and outer diameter surface 610). Next, the assembly including the helical gear 600 and heating tube 220 may be rotated, for example, about 180°. The heating tube 220 may be punched again into the outer diameter surface 610 (e.g., by installing the heating tube 220 over the outer diameter surface 610) at a location about 180° about from the first punch location. In such a manner, the helical gear 600 may be coupled to the heating tube 220.

A number of embodiments have been described. Nevertheless, it will be understood that various modifications may be made. For example, various combinations of the components described herein may be provided for embodiments of similar apparatus. For instance, although belts and chains are shown in the illustrated embodiments, other types of looped surfaces (e.g., continuous looped surfaces) may be used in place of belts or chains. Accordingly, other embodiments are within the scope of the present disclosure.

What is claimed is:

1. A roller grill, comprising:
   a housing structure adapted to support the roller grill;
   a plurality of tubular heating surfaces mounted between a first end of the housing structure and a second end of the housing structure;
   a first side housing coupled to the first end of the housing structure;
   a second side housing coupled to the second end of the housing structure, at least one of the first side housing or the second housing comprising a pressurized plenum maintainable at a plenum air pressure that is greater than a tubular air pressure of an inner volume of the plurality of tubular heating surfaces; and
   a drive assembly at least partially enclosed in the first side housing or the second side housing, the drive assembly configured to rotatably drive the plurality of tubular heating surfaces.

2. The roller grill of claim 1, further comprising a fan coupled to the housing structure and in airflow communication with the pressurized plenum and an ambient environment that surrounds the roller grill, the fan configured to circulate a flow of ambient air into the pressurized plenum to maintain the plenum air pressure greater than the tubular air pressure.

3. The roller grill of claim 2, further comprising a cover plate mountable to the one of the first side housing or the second housing that comprises the pressurized plenum to at least partially seal against an airflow between the pressurized plenum and the ambient environment independent of the flow of ambient air.

4. The roller grill of claim 3, wherein the cover plate comprises at least one relief opening that comprises an airflow pathway between the pressurized plenum and the ambient environment.

5. The roller grill of claim 4, wherein the airflow pathway between the pressurized plenum and the ambient environment comprises an adjustable opening area based on at least one of the plenum air pressure or the tubular air pressure.

6. The roller grill of claim 2, wherein the other of the first side housing or the second housing comprises a second pressurized plenum that is maintainable at a second plenum air pressure that is greater than the tubular air pressure of the inner volume of the plurality of tubular heating surfaces.

7. The roller grill of claim 6, further comprising a second fan coupled to the housing structure and in airflow communication with the second pressurized plenum and the ambient environment that surrounds the roller grill, the second fan configured to circulate a second flow of ambient air into the second pressurized plenum to maintain the second plenum air pressure greater than the tubular air pressure.

8. The roller grill of claim 1, wherein a surface temperature variation measured along a length of a first tubular heating surface of the plurality of tubular heating surfaces is within a range of between ±2° F. and ±5° F.

9. The roller grill of claim 1, wherein the drive assembly comprises a beltless direct drive assembly that comprises at least one drive gear in direct contact with a transfer gear, which in turn is in direct or indirect contact with at least one idler gear, which in turn is in direct contact with at least one tube gear.

10. The roller grill of claim 9, wherein at least one of the drive gear, the transfer gear, the idler gear, or the tube gear comprises a non-metallic gear.

11. The roller grill of claim 1, wherein the drive assembly comprises at least one drive gear driveably coupled to a belt or chain, which in turn is driveably coupled to at least one tube gear.

12. The roller grill of claim 1, wherein the drive assembly comprises a slip clutch motor.

13. A food preparation system, comprising:
    a housing structure;
    a plurality of roller tubes mounted between a first end of the housing structure and a second end of the housing structure, at least one of the roller tubes comprising an electric heater positioned to heat an outer surface of the roller tube;

a first side housing coupled to the first end of the housing structure;

a second side housing coupled to the second end of the housing structure, at least one of the first side housing or the second housing comprising a plenum maintainable at a plenum air pressure that is greater than a tubular air pressure of an inner volume of the plurality of roller tubes; and a drive system mounted in the housing and configured to rotatably drive the plurality of roller tubes.

14. The food preparation system of claim 13, further comprising a fan or pump coupled to the housing structure and in airflow communication with the plenum and an ambient environment, the fan or pump configured to circulate a flow of ambient air into the plenum to maintain the plenum air pressure greater than the tubular air pressure.

15. The food preparation system of claim 14, further comprising a cover plate mountable to the one of the first side housing or the second housing that comprises the plenum to at least partially seal against an airflow between the plenum and the ambient environment independent of the flow of ambient air.

16. The food preparation system of claim 15, wherein the cover plate comprises at least one relief opening that comprises an airflow pathway between the plenum and the ambient environment.

17. The food preparation system of claim 16, wherein the airflow pathway between the plenum and the ambient environment comprises an adjustable opening area based on at least one of the plenum air pressure or the tubular air pressure.

18. The food preparation system of claim 14, wherein the other of the first side housing or the second housing comprises a second plenum that is maintainable at a second plenum air pressure that is greater than the tubular air pressure of the inner volume of the plurality of roller tubes.

19. The food preparation system of claim 18, further comprising a second fan or pump coupled to the housing structure and in airflow communication with the second pressurized plenum and the ambient environment, the second fan or pump configured to circulate a second flow of ambient air into the second pressurized plenum to maintain the second plenum air pressure greater than the tubular air pressure.

20. The food preparation system of claim 13, wherein the drive system comprises a beltless direct drive assembly that comprises at least one drive gear in direct contact with a transfer gear, which in turn is in direct or indirect contact with at least one idler gear, which in turn is in direct contact with at least one tube gear.

21. The food preparation system of claim 20, wherein at least one of the drive gear, the transfer gear, the idler gear, or the tube gear comprises a non-metallic gear.

22. The food preparation system of claim 13, wherein the drive system comprises at least one drive gear driveably coupled to a belt or chain, which in turn is driveably coupled to at least one tube gear.

23. The food preparation system of claim 13, wherein the drive system comprises a slip clutch motor.

* * * * *